United States Patent
Akenine-Möller et al.

(10) Patent No.: US 11,282,258 B1
(45) Date of Patent: Mar. 22, 2022

(54) ADAPTIVE SAMPLING AT A TARGET SAMPLING RATE

(71) Applicant: NVIDIA Corporation, Santa Clara, CA (US)

(72) Inventors: Tomas Guy Akenine-Möller, Lund (SE); Jim Kjell David Nilsson, Malmö (SE); Johan Pontus Andersson, Skåne (SE)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/171,314

(22) Filed: Feb. 9, 2021

Related U.S. Application Data

(60) Provisional application No. 63/127,488, filed on Dec. 18, 2020, provisional application No. 63/108,643, filed on Nov. 2, 2020.

(51) Int. Cl.
  *G06T 15/00* (2011.01)
  *G06T 15/06* (2011.01)

(52) U.S. Cl.
  CPC ............ *G06T 15/005* (2013.01); *G06T 15/06* (2013.01)

(58) Field of Classification Search
  CPC .............................. G06T 15/005; G06T 15/06
  See application file for complete search history.

(56) References Cited

U.S. PATENT DOCUMENTS

| | | | | |
|---|---|---|---|---|
| 6,417,861 | B1 * | 7/2002 | Deering | G06T 15/005 345/589 |
| 2001/0028352 | A1 * | 10/2001 | Naegle | G06T 15/005 345/501 |
| 2008/0024515 | A1 * | 1/2008 | Yang | G06T 15/06 345/592 |
| 2010/0277478 | A1 * | 11/2010 | Ihm | G09G 5/14 345/426 |
| 2016/0314610 | A1 * | 10/2016 | Lee | G06T 15/005 |
| 2017/0278296 | A1 * | 9/2017 | Chui | G06T 17/10 |
| 2017/0323475 | A1 * | 11/2017 | Moreton | G06T 15/30 |
| 2017/0358109 | A1 * | 12/2017 | Troiano | G06T 11/001 |
| 2018/0284872 | A1 * | 10/2018 | Schluessler | G06F 9/5083 |
| 2019/0005713 | A1 * | 1/2019 | Nevraev | G06T 17/10 |
| 2019/0213438 | A1 * | 7/2019 | Jones | G06K 9/6274 |

(Continued)

OTHER PUBLICATIONS

Bauszat et al. ("Adaptive Sampling for Geometry-aware Reconstruction Filters", 2011) (Year: 2011).*

(Continued)

*Primary Examiner* — Phong X Nguyen

(74) *Attorney, Agent, or Firm* — Leydig, Voit & Mayer, Ltd.

(57) ABSTRACT

Image quality can be improved by rendering the image based on an importance map that indicates regions of the image that will benefit from more samples. Adaptive sampling determines a number of samples for each pixel of the image using a target sampling rate and the importance map for the image. The number of samples for each pixel needs to be a non-negative integer value, so the per-pixel sampling rates are quantized using per-pixel random values. The resulting quantized sampling rates provides a distribution of samples that closely matches the importance map. The per-pixel random values may vary over time so that the average of the distribution more closely matches the importance map.

21 Claims, 14 Drawing Sheets

(56) References Cited

U.S. PATENT DOCUMENTS

| | | | |
|---|---|---|---|
| 2020/0020134 A1* | 1/2020 | Tsukuba | H04N 19/159 |
| 2020/0314442 A1* | 10/2020 | Andersson | H04N 19/513 |
| 2020/0380763 A1* | 12/2020 | Abramov | G06T 15/06 |
| 2021/0027509 A1* | 1/2021 | Kato | G06T 15/005 |
| 2021/0109987 A1* | 4/2021 | Avila | G06T 15/50 |

OTHER PUBLICATIONS

Christensen et al. ("Progressive Multi-Jittered Sample Sequences", 2018) (Year: 2018).*

Corcoran et al. ("Time-Critical Ray-Cast Direct Volume Rendering", 2011) (Year: 2011).*

Hachisuka, T., et al., "Multidimensional Adaptive Sampling and Reconstruction for Ray Tracing," UC San Diego, Harvard University, University of Virginia, pp. 1-10.

Kuznetsov, A., et al., "Deep Adaptive Sampling for Low Sample Count Rendering," Eurographics Symposium on Rendering 2018, vol. 37 (2018), No. 4, University of CA, San Diego, pp. 1-10.

Bauszat, P., et al., "Adaptive Sampling for Geometry-aware Reconstruction Filters," In Vision, Modeling and Visualization (Oct. 2011), pp. 183-190.

Rousselle, F., "Image Space Adaptive Rendering," PhD. Thesis, University of Bern, 2014.

\* cited by examiner

Importance Map 100

Threshold-Based Sampling Map 105

Threshold-Based Power-of-Two Sampling Map 110

ADAPTIVE SAMPLING AT A TARGET SAMPLING RATE

CLAIM OF PRIORITY

This application claims the benefit of U.S. Provisional Application No. 63/108,643 titled "Adaptive Sampling for Ray-Tracing Using a Fixed Budget with Pseudorandom Properties," filed Nov. 2, 2020 and U.S. Provisional Application No. 63/127,488 titled "Power-of-Two Adaptive Sampling for Rendering Using a Fixed Budget," filed Dec. 18, 2020, the entire contents of both applications are incorporated herein by reference.

BACKGROUND

Interactive graphics systems provide finite real-time rendering capacity, forcing a trade-off between image quality and frame rate. Instead of simply increasing the number of samples per pixel (spp) for every pixel to improve image quality, adaptive sampling distributes a fixed budget of samples for the entire rendered image assigning more samples to pixels that will benefit the most from more and fewer samples to other pixels. Conventional adaptive sampling techniques use an importance map, which is an array as large as the rendered image, to identify the pixels that will benefit the most from more samples. The importance values for each pixel are not typically integers and the resulting number of samples for each pixel are either rounded up or truncated to determine an integer number of samples for each pixel. Producing integer values by rounding up or truncating results in a "staircased" distribution. The staircased distribution typically does not average over time to equal the importance map and therefore may not achieve the desired image quality in terms of the fixed budget. There is a need for addressing these issues and/or other issues associated with the prior art.

SUMMARY

Embodiments of the present disclosure relate to adaptive sampling at a target sampling rate. Systems and methods are disclosed that distribute the samples over the image plane in a manner that matches the importance map while also attempting to meet a target average per-pixel sample rate (e.g., fixed budget) over the image such that the fixed budget is not exceeded. The target (average) per-pixel sample rate may be determined based on a desired frame rate or image quality. The number of samples distributed to each pixel are quantized using random values so that the quantized distribution is smoother compared with the conventional technique, such as those described above.

Satisfying the target sampling rate reduces the computational effort for rendering each image compared with rendering all pixels at a higher sampling rate. Therefore, satisfying the target sampling rate may advantageously allow a rendering system to operate at a higher frame rate while providing the same quality of visual experience. A rendering system that is not frame rate limited may advantageously operate at lower power. Adaptive shading applies generally to rendering graphics primitives, including two-dimensional (2D) graphics primitive and three-dimensional (3D) graphics primitives.

A method, computer readable medium, and system are disclosed for adaptive sampling that comprise determining a total number of samples for an image based on a target per-pixel sampling rate for the image, distributing the total number of samples across pixels included in the image according to an importance map to produce an initial sampling map for the image, and quantizing the initial sampling map using per-pixel random values to produce a sampling map for the image including an integer number of samples for each pixel in the image.

BRIEF DESCRIPTION OF THE DRAWINGS

The present systems and methods for adaptive sampling are described in detail below with reference to the attached drawing figures, wherein.

DETAILED DESCRIPTION

Systems and methods are disclosed related to adaptive sampling at a target sampling rate. The target sampling rate may be determined based on a desired frame rate or image quality. The target sampling rate is applied to the number of pixels per image (or frame) to calculate a total number of samples. In an embodiment, the target sampling rate is not an integer number and is represented as a floating-point number to best correspond to real-time frame rates. The total number of samples are then distributed over the image in a manner based on an importance map and quantized to integer sampling rates for each pixel. The quantization is performed using random values to produce a distribution that closely matches the distribution of the importance map.

Figure 1A:
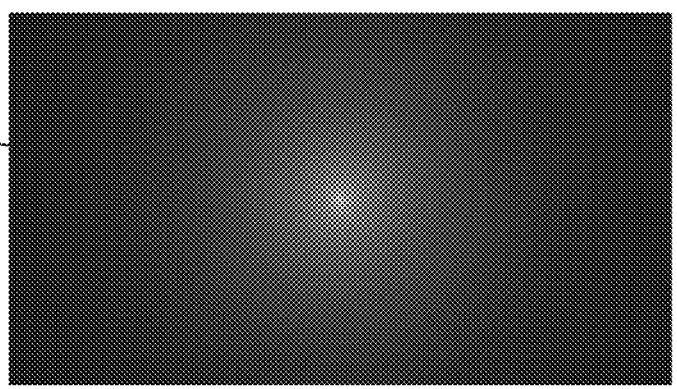
FIG. 1A illustrates an importance map and a sampling map generated using a prior art technique.
Figure 1A:
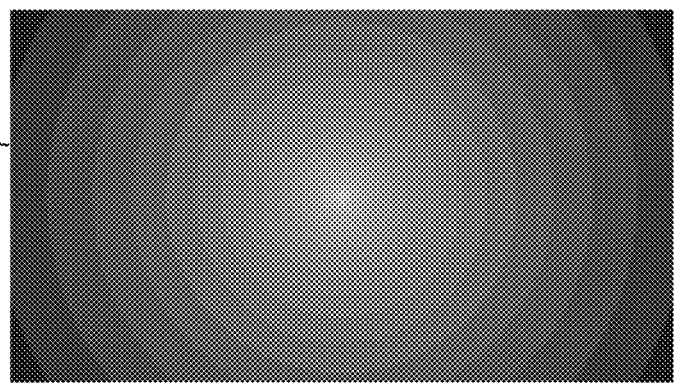

FIG. 1A illustrates an importance map 100 and a threshold-based sampling map 105 that is generated using a prior art technique. The importance map is usually as large as the image to be rendered and defines an importance or priority value for each pixel in the image. The values may be used to determine how many samples should be used to produce a final value for each pixel. Brighter areas of the importance map 100 correspond to higher values and darker areas correspond lower values. An ideal sampling map would have sampling rates that correspond to the importance map 100—smoothly varying as the sampling rate and/or importance values increase and/or decrease.

In an embodiment, the importance map 100 is a down-sampled version of the full resolution image, in which case the importance map 100 should be accessed using nearest neighbor filtering, or bilinear filtering, or some higher-order filter. A threshold-based sampling map 105 is generated based on the importance map 100 using conventional techniques.

In an example, when the target sampling rate specifies the average number of samples per pixel, d=4.2, each pixel should receive 4.2 samples on average and the samples should be spread out over the pixels according to the importance map 100. The threshold-based sampling map 105 has an average sampling rate of 4.22 per-pixel. The threshold-based sampling map 105 is computed based on the importance map 100 using round( ) or floor( ), which produces the "staircased" distribution.

Figure 1B:
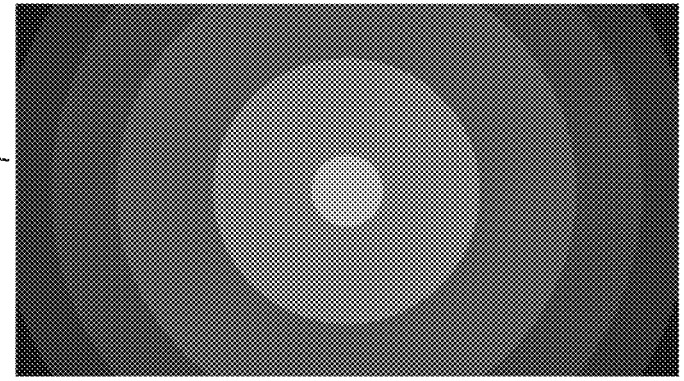
FIG. 1B illustrates a sampling map suitable for use in implementing some embodiments of the present disclosure.

FIG. 1B illustrates a sampling map suitable for use in implementing some embodiments of the present disclosure. A threshold-based power-of-two sampling map 110 has an average sampling rate per-pixel of 4.05 and includes sampling rates that are constrained to equal power of two values ($2^i$, where i is a non-negative integer). Compared with the threshold-based sampling map 105, the staircasing is more apparent in the threshold-based power-of-two sampling map 110. Power-of-two values may be preferred when using low discrepancy sequences (LDS) for sampling.

Thresholding may not always get close to the target (average) per-pixel sampling rate of d on average. For example, if all pixels have a sampling rate=2.45 based on the importance map, then each pixel is allocated 2 samples, while if all pixels have a sampling rate=2.55, each pixel is allocated 3 samples. Failure to match the target per-pixel sampling rate may lead to under use of hardware resources or overuse, in which case, an application may not meet its real-time requirements. When the pixel sampling rates are constrained to be values that are powers-of-two then the target per-pixel sampling rate may be even more difficult to match when thresholding is used.

Figure 1C:
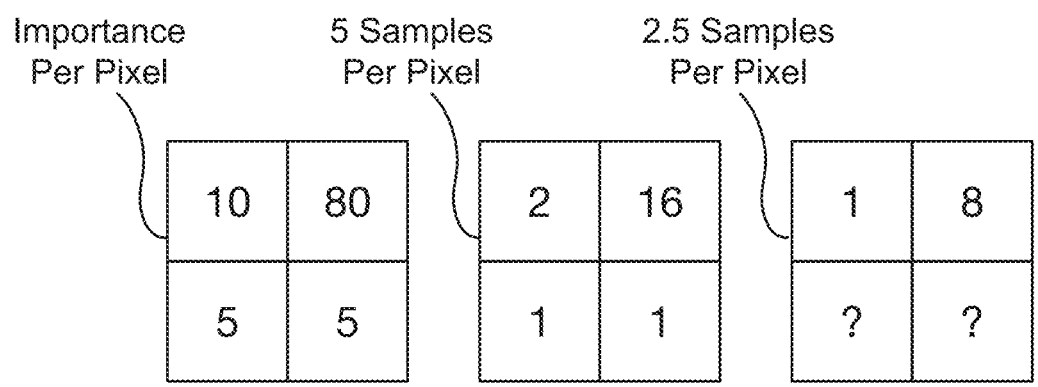
FIG. 1C illustrates an importance map and sampling maps suitable for use in implementing some embodiments of the present disclosure.

FIG. 1C illustrates an importance map and sampling maps suitable for use in implementing some embodiments of the present disclosure. The per-pixel importance values are 10, 80, 5, and 5. When the target sampling rate is d=5 samples per-pixel, the number of samples are computed as 2, 16, 1, and 1, respectively. When d=2.5, the number of samples are computed as 1, 8, and two other integer values. When thresholding is used, the two other values may both equal either 0 or 1. However, having one of the other values set to 0 and the other set to 1 would produce an average sampling rate closer to the target sampling rate. Unfortunately, determining the sampling rates of the two bottom pixels to two different values is a sequential operation because the value of one depends on the other. In contrast, using thresholding to round up or down to the nearest integer can be performed in parallel for all pixels, but produces either two 0s or two 1s, which is undesirable. As described further herein, a quantizing technique that can be performed in parallel can also compute sampling rates that, average to a value closer to the target sampling rate and closely match the importance map.

Figure 1D:
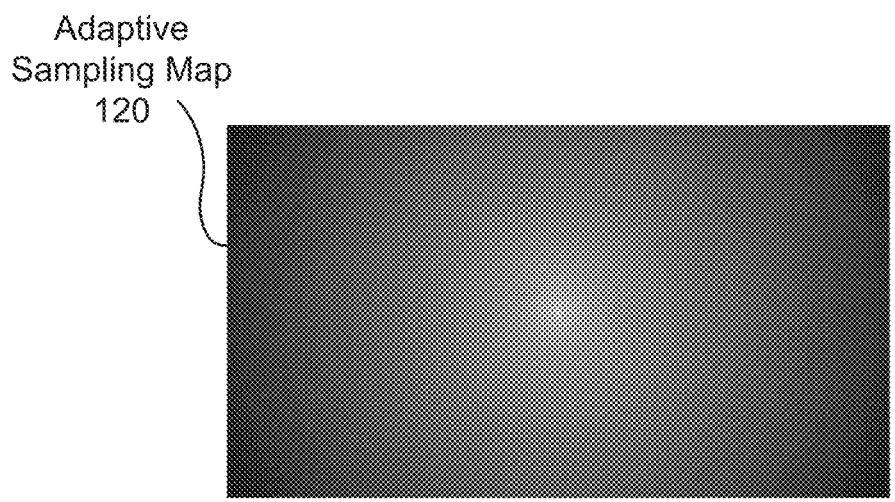
FIG. 1D illustrates an adaptive sampling map, in accordance with an embodiment.

FIG. 1D illustrates an adaptive sampling map 120, in accordance with an embodiment. The adaptive sampling map 120 is computed based on the importance map 100 and random values that are used to quantize the per-pixel sampling values. Compared with the threshold-based sampling map 105 that is also computed based on the importance map 100, the adaptive sampling map 120 is smoother and more closely corresponds with the importance map 100. The per-pixel sampling values n(x,y) in the adaptive sampling map 120 are computed by first computing a total number of samples for the image as the product of that target sampling rate, d, and the image (and importance map) dimensions, w and h. The total number of samples represents a total budget of samples to be distributed across all of the pixels in the image. The importance values i(x,y) for the image are summed to produce an importance total, $s=\Sigma i(x,y)$. Then, a factor is computed as the total number of samples (e.g., product of d, w, and h) divided by the importance total. Thus, the factor is dwh/s. Alternatively, an average importance per pixel (ipp) may be computed as the importance total divided by a product of the image dimensions, ipp=s/wh. The factor is then computed as d/ipp=dwh/s. The factor is computed once for all of the pixels in the image and may be considered a first step of the adaptive sampling algorithm. The importance values and/or per-pixel sampling values may vary for each image and/or over time. For example, a sequence of frames may include a sequence of images, per-image importance values, and/or per-image random values.

A second step may be executed over all pixels in parallel. An initial sampling map may be computed by scaling the importance value for each pixel by the factor to produce an initial sampling rate for each pixel, n_initial(x,y)=factor·i(x, y). Multiplying the importance values by the factor distributes the total number of samples across all of the pixels and ensures that the target sampling rate is not exceeded for the initial sampling map.

Typically, all values in the initial sampling map n_initial (x,y) will not be integers and the final sampling rates should be integers, because rendering is performed using integer sampling rates. Therefore, the non-integer values of the initial sampling map are quantized to produce an integer sampling rate in the adaptive sampling map n(x,y). The values may be quantized by rounding each value to the nearest lower integer (e.g., floor operation) or using a conventional rounding function. However, conventional rounding produces a similar result as thresholding as shown in the threshold-based sapling map 105 shown in FIG. 1A. In an embodiment, the initial sampling rates are instead quantized using per-pixel random values.

More specifically, the fractional portion of each initial sampling rate may be removed and an additional sample may be added to the remaining integer portion of the floating-point value if a random number (between 0 and 1)

is less than or equal the fractional portion. For example, if the initial sampling rate for a pixel is 5.25, a random number, r∈[0,1] is used to determine whether 5 or 6 samples are used as the sampling rate for the pixel. The random numbers can be computed on the fly or looked up in a texture containing random values. If r>0.25, then the initial sampling rate is quantized to 5 samples, and otherwise, the initial sampling rate is quantized to 6 samples.

Figure 1E:
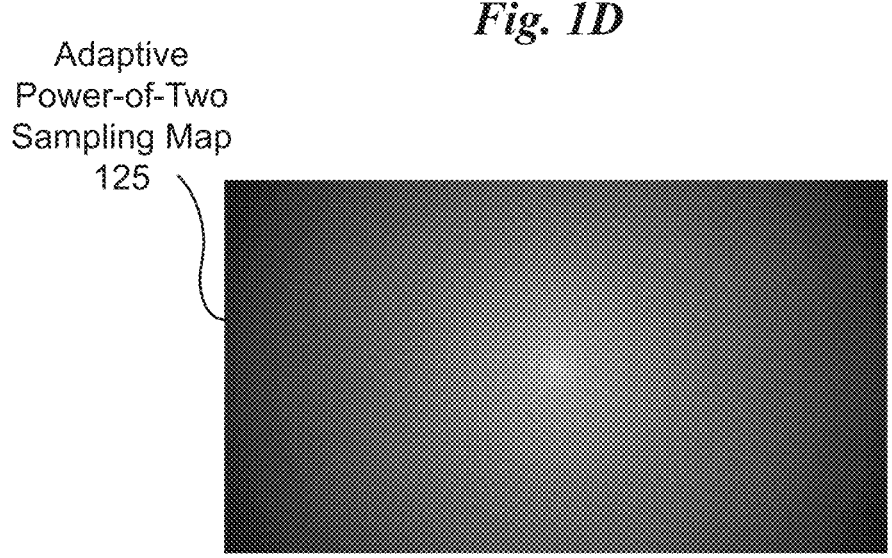
FIG. 1E illustrates an adaptive power-of-two sampling map suitable for use in implementing some embodiments of the present disclosure.

FIG. 1E illustrates an adaptive power-of-two sampling map 125 suitable for use in implementing some embodiments of the present disclosure. Compared with the adaptive sampling map 120, the initial sampling rates are quantized to power-of-two values using per-pixel random values. Compared with the threshold-based power-of-two sampling map 110, the adaptive power-of-two sampling map 125 is smoother and more closely corresponds to the importance map 100.

Advantageously, the initial sampling rate for each pixel may be quantized independently, so the initial sampling rates can be quantized in parallel. Furthermore, any error between the total number of samples and a sum of the quantized sampling rates for all of the pixels is reduced over time because the fractional portion functions as a probability value controlling a distribution of the quantization results (incrementing or not). In other words, for any particular initial sampling rate value there will be a distribution of quantized sampling rates having a value equal to the integer portion of the initial sampling rate value and a value equal to the integer portion incremented by one. More specifically, for a fractional portion of 0.25, the integer portion is incremented 25% of the time on average and is not incremented 75% of the time.

In contrast, with the conventional thresholding technique where all sampling rates that equal 5.25 are quantized to either 5 or 6, quantizing using a random number causes a majority of initial sampling rates that equal 5.25 to become 5 and others to become 6. In another example, quantizing all sampling rates that equal 2.45 to 2 using conventional thresholding may result in under use of the hardware resources whereas quantizing all sampling rates that equal 2.55 to 3 may result in a failure to satisfy a target frame rate. Using the random values to quantize the initial sampling map produces a distribution that better matches that of the importance map and may more easily satisfy a target frame rate and/or target sampling rate. Because generation of the initial sampling map can be performed in parallel for all of the pixels and the quantization can be performed in parallel for all of the pixels, the adaptive sampling may be produced quickly—achieving real-time frame rates.

TABLE 1 includes pseudocode for an adaptive sampling technique that can be executed in parallel for each pixel. After ipp and factor are computed for an importance map in a first step, the initial sampling map is computed in a second step. The initial sampling map includes an SPP_float value for each pixel. The SPP_float values are separated into integer and fraction portions for quantization. The integer portion (whole_samples) equals the SPP_float truncated (floor operation). The fraction portion (fraction) is the portion of SPP_float that is truncated. The fraction portion for each pixel is compared with a random number between zero and one (inclusive).

TABLE 1

Adaptive Sampling Pseudocode

```
// First step:
// computations before per-pixel work starts
ipp = sum(importance_map) / (w * h);
// the target sampling rate d may be set by the user,
factor = (d / ipp);
// Second step:
//for each pixel (x, y):
SPP_float = importance_map(x, y) * factor; // num SPP as a float
whole_samples(x, y) = floor(SPP_float(x, y));
fraction(x, y) = SPP_float(x, y) - whole_samples(x, y);
num_samples(x, y) = whole_samples(x, y);
if rand( ) < fraction(x, y) num_samples(x,y)++; end
```

In contrast with conventional thresholding techniques, an integer number of samples for each pixel is either incremented or not based on a comparison of the fractional portion of n_initial(x,y) (or SPP_float(x,y)) and a random value. In an embodiment, the per-pixel random values are generated by a random function or orthogonal array sampling. In an embodiment, the per-pixel random values comprise a random texture, a multi-jittered texture, a blue noise texture, red noise texture, or the like.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1F:
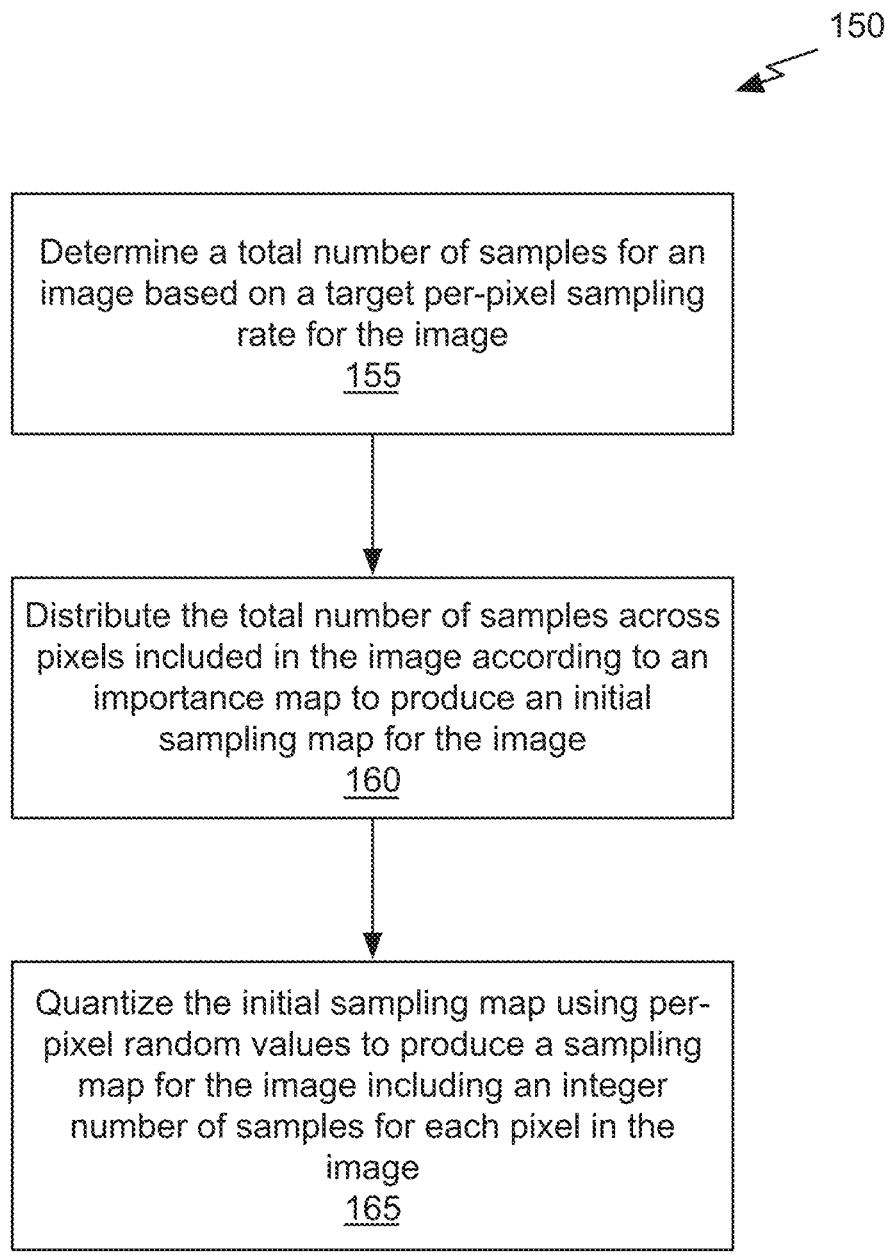
FIG. 1F illustrates a flowchart of a method suitable for use in implementing some embodiments of the present disclosure.

FIG. 1F illustrates a flowchart of a method 150 suitable for use in implementing some embodiments of the present disclosure. Each block of method 150, described herein, comprises a computing process that may be performed using any combination of hardware, firmware, and/or software. For instance, various functions may be carried out by a processor executing instructions stored in memory. The method 150 may also be embodied as computer-usable instructions stored on computer storage media. The method may be provided by a standalone application, a service or hosted service (standalone or in combination with another hosted service), or a plug-in to another product, to name a few. In addition, method 150 may additionally or alternatively be executed by any one system, or any combination of systems, including, but not limited to, those described herein. Furthermore, persons of ordinary skill in the art will understand that any system that performs method 150 is within the scope and spirit of embodiments of the present disclosure.

At step 155, a total number of samples for an image is determined based on a target per-pixel sampling rate (d) for the image. In an embodiment, the target per-pixel sampling rate is computed based on a rendering frame rate and a target frame rate. In an embodiment, the total number of samples is a product of the target per-pixel sampling rate and dimensions of the image. In an embodiment, the total number of samples is computed as dwh, where w is the width and h is the height of the image.

At step 160, the total number of samples is distributed across pixels included in the image, according to an importance map, to produce an initial sampling map for the image. In an embodiment, step 160 is performed in parallel for at least a portion of the pixels in the image. In an embodiment, per-pixel values in the importance map are summed to produce an importance total, s=Σi(x,y). A factor that is used to distribute the total number of samples may be computed by dividing the total number of samples by s. In an embodiment, an average importance per-pixel ipp is computed as s/wh and the factor is computed as d/ipp. In an embodiment, d, s, ipp, and the factor are floating point numbers. In an embodiment, the total number of samples are distributed across each pixel in the image by multiplying the factor by the per-pixel value in the importance map for the pixel to produce an initial sampling rate for the pixel. In an embodiment, a minimum number of samples are distributed to each pixel before distributing a remainder of the total number of samples across the pixels. In an embodiment, the remainder of the total number of samples is distributed across the pixels according to the importance map. For example, a minimum number of samples equal to one may be distributed to each pixel.

In an embodiment, the minimum sampling rate is greater than zero and less than the target sampling rate. In an embodiment, a total number of samples for a sampling map n(x,y) ideally satisfies the following:

$$\Sigma n(x,y)=dwh=mwh+(d-m)wh, \quad \text{Eq. (1)}$$

where mwh is the minimum number of samples that are distributed to the pixels and (d−m)wh is the remainder that is distributed to the pixels according to the importance map. Adding and normalizing the importance over the image, produces $$\sum \frac{i(x,y)}{s} = 1 \Leftrightarrow \sum \frac{i(x,y)(d-m)wh}{s} = (d-m)wh. \quad \text{Eq. (2)}$$

A variable k is defined as the remainder divided by the importance total, k=(d−m)wh/s, where k equals the factor for m=0, and substituting k into Equation (2) results in $\Sigma ki(x,y)=(d-m)wh$.

At step 165, the initial sampling map is quantized using per-pixel random values to produce a sampling map for the image including an integer number of samples for each pixel in the image. In an embodiment, the integer number is a power-of-two value. In an embodiment, step 165 is performed in parallel for at least a portion of the pixels in the image. In an embodiment, the image is a frame included in a sequence of frames (e.g., video) and the per-pixel random values vary for each frame in the sequence. In an embodiment, the per-pixel random values are read from a texture map or generated by a function. In an embodiment, a scene is rendered according to the sampling map to produce a frame. In an embodiment, the scene is rendered using ray tracing and the sampling map controls a number of rays that are cast for each pixel in the frame.

In an embodiment, quantizing the initial sampling map comprises, for each pixel in the image, separating an initial sampling rate for the pixel that is included in the initial sampling map into an integer portion and a fraction portion. The integer portion is incremented to produce a quantized sampling rate that is included in the sampling map for the pixel when the random value is less than the fraction portion. The quantized sampling rate is set to equal the integer portion when the random value is not less than the fraction portion.

In an embodiment, the initial sampling rate n(x,y) is quantized using the following equation:

$$n(x,y)=m+\lfloor ki(x,y) \rfloor+(r(x,y,t)<\text{frac}(ki(x,y))?1:0), \quad \text{Eq. (3)}$$

where frac( ) returns the fractional part of its argument and (a ? b:c) returns b if a is true, else c. In an example, if ki(x,y)=5.25, i.e., the ideal number of samples for a certain pixel, the first part of the expression in Equation (3) is the minimum number of samples m plus ⌊5.25⌋=5. The fractional part frac(5.25)=0.25, meaning that one is added with a 0.25 probability, and zero is added with a 0.75 probability. The per-pixel random values r(x,y,t) may vary over time (t).

To quantize the initial sampling rate to a power-of-two number using rounding without any random values, the following equation may be used:

$$n(x,y)=b+\Delta\text{round}(f), \quad \text{Eq. (4)}$$

where $b=2^p$ is a power-of-two number that is computed individually per-pixel and $f \in [0,1]$. In most cases, Δ=b, which implies that n(x,y) is either b or 2b, i.e., a power-of-two. In an embodiment, the minimum number of samples m is a power-of-two number. The variables f, b, and Δ are computed differently dependent on whether the initial sampling rate $c=m+\lfloor ki(x,y) \rfloor$ is zero or is greater than zero:

$$\text{if } c = 0 \begin{cases} b = 0 \\ \Delta = 1 \end{cases} \quad \text{Eq. (5)}$$

$$\text{if } c > 0 \begin{cases} b = 2^{h(c)} \\ \Delta = b \end{cases}$$

$$f = \frac{m + ki(x,y) - b}{\Delta}.$$

Note that when c is zero, f reduces to f=ki(x,y), since m must be zero and b=0 and Δ=1. When the quantized sampling rates are restricted to power-of-two numbers, assume that a function h(n) returns the first high bit (e.g., the leading one) in a positive integer n. When c>0, b becomes the largest power-of-two that is equal to c or smaller and rounding is used to quantize n(x,y) to either b or 2b. For example, if m=0 and c=14.2, then h(14.2)=3 and thus $b=2^3=8$. Therefore, n=16, since Δ=8 and f=(14.2−8)/8=0.775 and round (0.775)=1.

However, using the round operation to quantize the sampling rate typically results in a staircased quantization, such as the threshold-based power-of-two sampling map 110 shown in FIG. 1B. Equation (6) may be used to quantize the sampling rates to power-of-two values using per-pixel random numbers resulting in a more accurate sampling map, such as the adaptive power-of-two sampling map 125 shown in FIG. 1E. The values of b, f, and Δ are computed according to Equation (5).

$$n(x,y)=b+(r(x,y,t) \le f?\Delta:0). \quad \text{Eq. (6)}$$

Figure 2A:
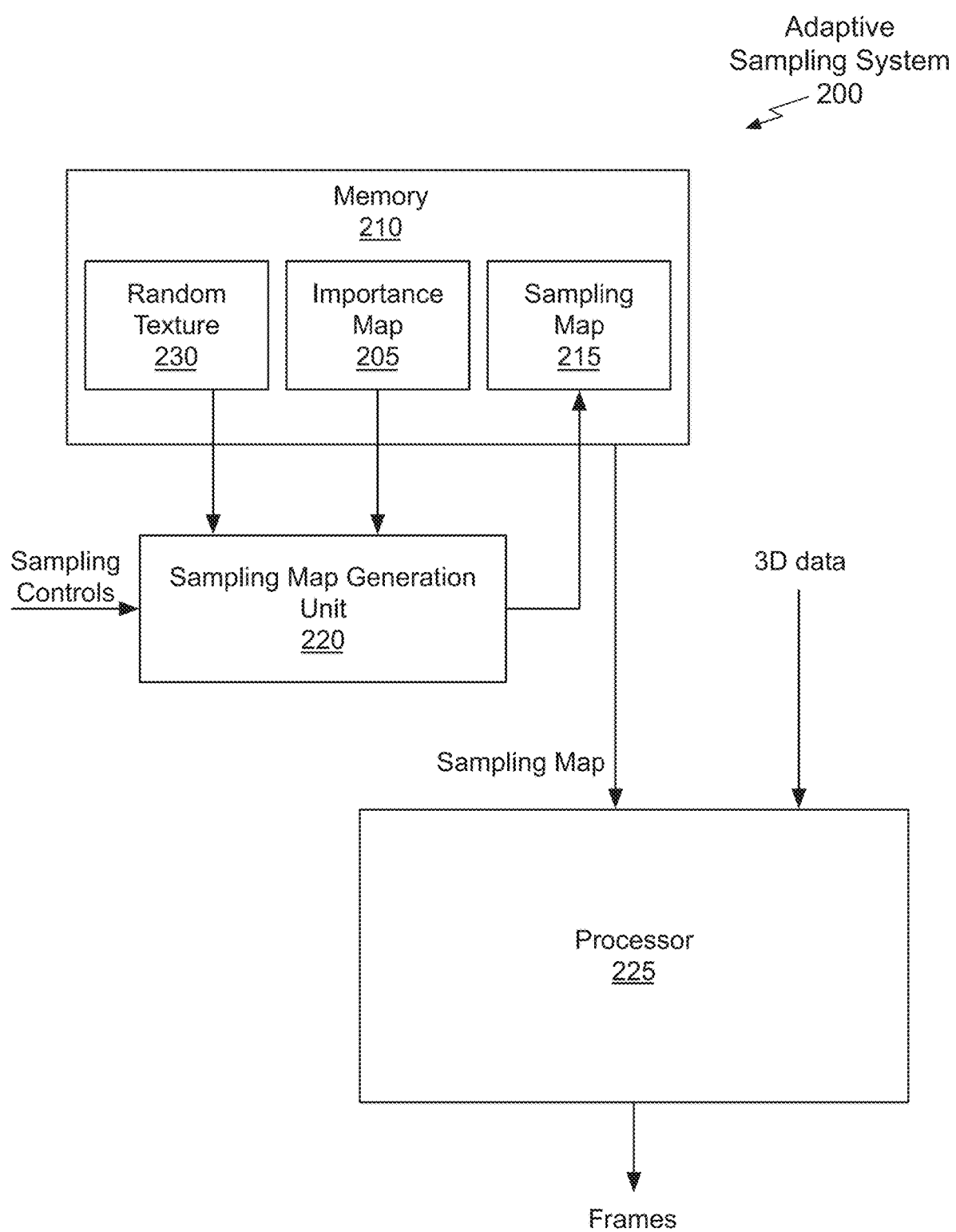
FIG. 2A illustrates a block diagram of an example adaptive sampling system suitable for use in implementing some embodiments of the present disclosure.

FIG. 2A illustrates a block diagram of an example adaptive sampling system suitable for use in implementing some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. Furthermore, persons of ordinary skill in the art will understand that any system that performs the operations of the adaptive sampling system 200 is within the scope and spirit of embodiments of the present disclosure.

The adaptive sampling system 200 includes a memory 210, a sampling map generation unit 220, and a processor 225. In an embodiment, the operations performed by the sampling map generation unit 220 may be performed by the processor 225. The memory 210 stores a random texture 230, importance map 205, and a sampling map 215. The sampling map generation unit 220 receives sampling controls that may include one or more of a target sampling rate (d), a target frame rate, image dimensions (w and h), a minimum sampling rate (m), and power-of-two sampling enable/disable. The sampling controls may also specify a random texture, random function, or other source of random numbers to be used for quantizing the sampling map.

In an embodiment, the random texture 230 is smaller than the image to be rendered and is repeated over the image using REPEAT as a texture wrap mode. The random texture 230 can be generated in any manner and may include pure random values, jittering, multi-jittering, orthogonal array sampling, blue noise random values, red noise random values, and the like. In an embodiment, the random texture 230 is a three-dimensional random texture, where the third dimension is frame number or time. Therefore, the distribution of the random numbers will change from frame to frame, so that the adaptive sampling maps 215 average towards the importance map as the number of frames increases. For example, a 3D blue-noise texture may be used with dimensions 256×256×128 pixels, where 256×256 is the spatial dimensions and 128 is the frame (or time) dimension. For the first frame, the first 256×256 slice of the 3D texture is used by the sampling map generation unit 220 to quantize the sampling map. For the second frame, the second 256 256 slice is used, and so on. When the last frame is reached, the sampling map generation unit 220 may repeat the sequence starting at the first slice.

In an embodiment, the sampling map generation unit 220 determines a total number of samples based on the target per-pixel sampling rate defined by the sampling controls. In an embodiment, the target per-pixel sampling rate is a floating-point number. The total number of samples are then distributed across pixels according to the importance map to produce an initial sampling map. In an embodiment, a minimum number of samples are distributed to all of the pixels before a remainder of the total number of samples less a product of the minimum number and the number of pixels is distributed across the pixels according to the importance map. The initial sampling map may be stored in the memory 210 as the sampling map 215. The sampling map generation unit 220 then quantizes the initial sampling map using per-pixel random values in the random texture 230 to produce a sampling map.

In an embodiment, the initial sampling map (ism) includes per-pixel floating point values that for each pixel that specify a target number of samples for the pixel, ism(x,y). The per-pixel random values between 0 and 1 are effectively used to select either floor(ism(x,y)) when the random number for the pixel is less than the fractional portion of ism(x,y), i.e., random(x,y)<frac(ism(x,y)). Otherwise, the sampling rate is for the pixel is quantized to ceil(ism(x,y)). The sampling map may replace the initial sampling map and be stored in the memory 210 as the sampling map 215 or as a separate sampling map. The quantized sampling map stores an integer value for each pixel and, when power-of-two sampling is enabled, the integer values are constrained to be power-of-two numbers.

The processor 225 receives the sampling map and 3D data for a scene that is rendered using the sampling map to produce frames. In an embodiment, the scene is rendered using ray tracing and the sampling map controls a number of rays that are cast for each pixel in the frame. In an embodiment, the scene is rendered using rasterization or other techniques, including hybrid techniques.

Figure 2B:
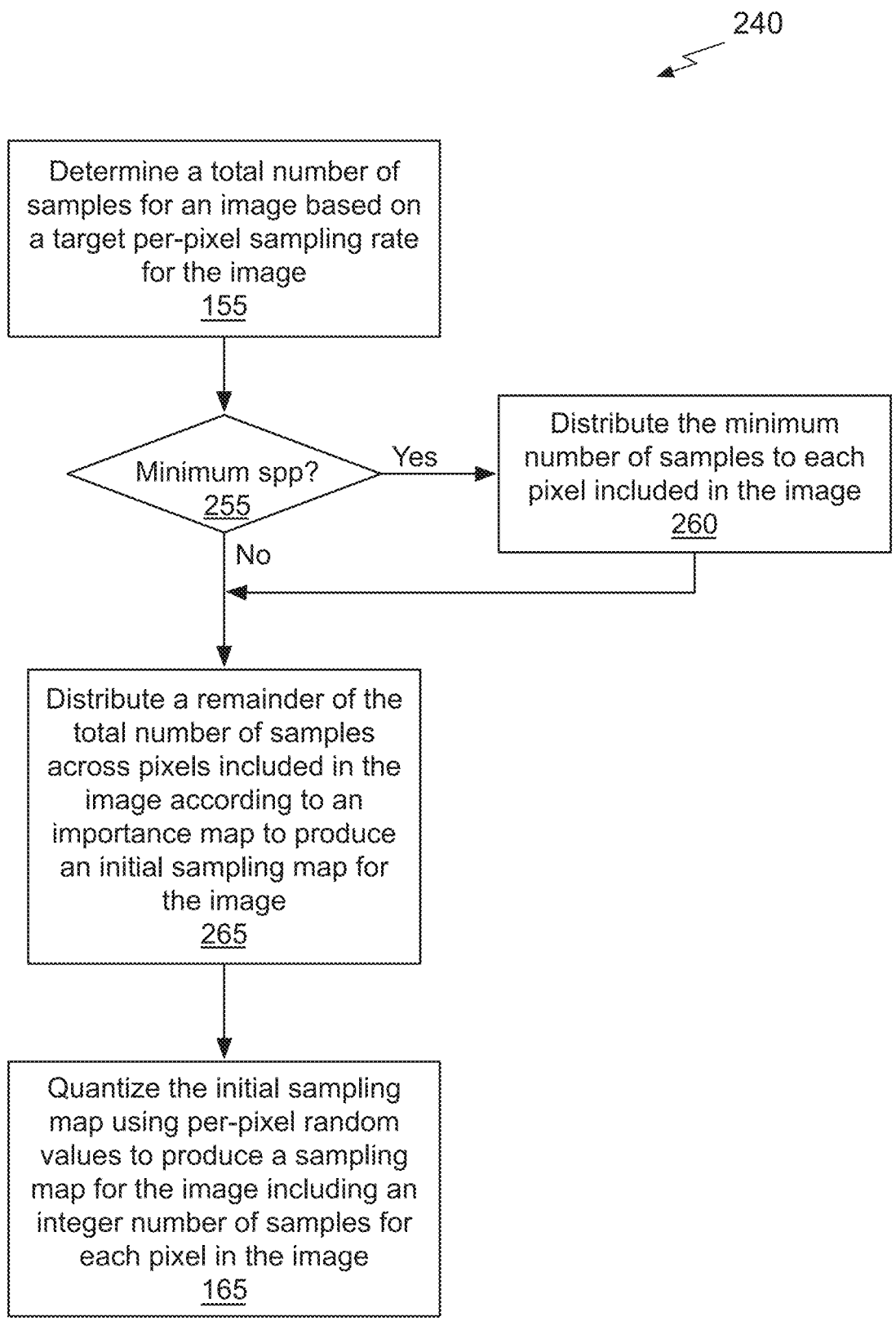
FIG. 2B illustrates a flowchart of another method suitable for use in implementing some embodiments of the present disclosure.

FIG. 2B illustrates a flowchart of a method 240 for adaptive sampling, in accordance with an embodiment. Each block of method 240, described herein, comprises a computing process that may be performed using any combination of hardware, firmware, and/or software. For instance, various functions may be carried out by a processor executing instructions stored in memory. The method 240 may also be embodied as computer-usable instructions stored on computer storage media. The method 240 may be provided by a standalone application, a service or hosted service (standalone or in combination with another hosted service), or a plug-in to another product, to name a few. In addition, method 240 is described, by way of example, with respect to the system of FIG. 2A. However, this method may additionally or alternatively be executed by any one system, or any combination of systems, including, but not limited to, those described herein. Furthermore, persons of ordinary skill in the art will understand that any system that performs method 240 is within the scope and spirit of embodiments of the present disclosure.

The method 240 includes steps 155 and 165 from method 150. After step 155, the method 240 determines if a minimum number of samples per-pixel is required. A minimum number of samples per-pixel may be specified by a user and/or an application program. If, at step 255, a minimum number of samples per-pixel is required, then at step 260, the minimum number of samples is distributed to each pixel included in the image. At step 265, a remainder of the total number of samples is distributed across pixels included in the image, according to an importance map, to produce an initial sampling map for the image. When the minimum number of samples is zero, the remainder of the total number of samples equals the total number of samples. After step 265, the method proceeds to step 165 to quantize the initial sampling map.

Figure 2C:
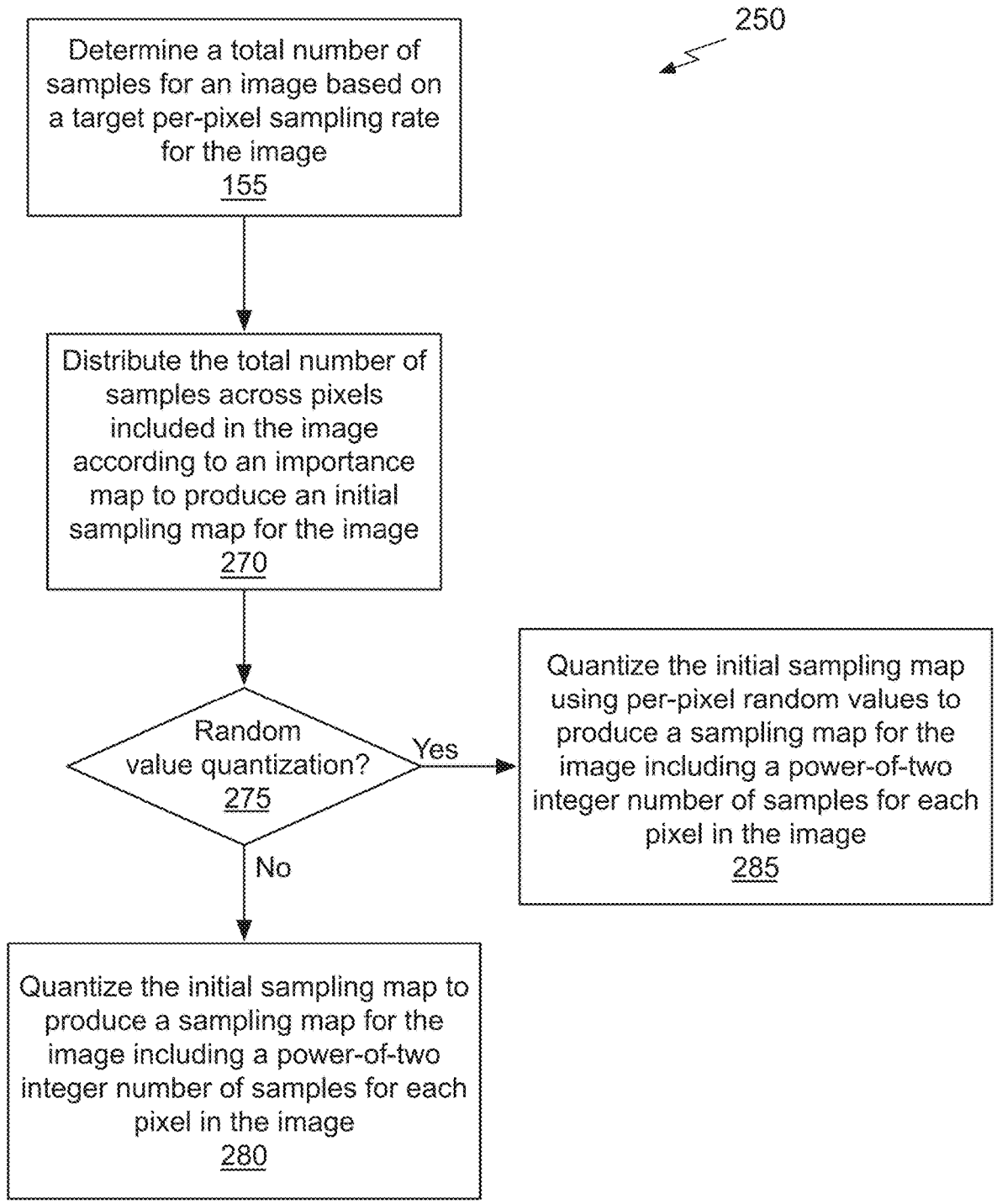
FIG. 2C illustrates a flowchart of a method for adaptive sampling using power-of-two sampling rates, in accordance with an embodiment.

FIG. 2C illustrates a flowchart of a method 250 for adaptive sampling using power-of-two sampling rates, in accordance with an embodiment. Each block of method 250, described herein, comprises a computing process that may be performed using any combination of hardware, firmware, and/or software. For instance, various functions may be carried out by a processor executing instructions stored in memory. The method 250 may also be embodied as computer-usable instructions stored on computer storage media. The method 250 may be provided by a standalone application, a service or hosted service (standalone or in combination with another hosted service), or a plug-in to another product, to name a few. In addition, method 250 is described, by way of example, with respect to the system of FIG. 2A. However, this method may additionally or alternatively be executed by any one system, or any combination of systems, including, but not limited to, those described herein. Furthermore, persons of ordinary skill in the art will understand that any system that performs method 250 is within the scope and spirit of embodiments of the present disclosure.

The method 250 includes step 155 from method 150. At step 270, the total number of samples is distributed across pixels included in the image, according to an importance map, to produce an initial sampling map for the image. In an embodiment, the initial sampling rate computed for each pixel is $c=m+\lfloor \lfloor ki(x,y) \rfloor \rfloor$.

If, at step 275, random value quantization is not used, then at step 280 the initial sampling map is quantized using Equation (4) to quantize the initial sampling rates to power-of-two numbers using rounding without any random values. Otherwise, at step 285, the initial sampling map is quantized using per-pixel random values according to Equation (6) to produce a sampling map for the image including a power-of-two integer number of samples for each pixel in the image. For steps 280 and 285, the values of b, f, and Δ for the per-pixel initial sampling rates may be computed according to Equation (5).

Figure 3A:
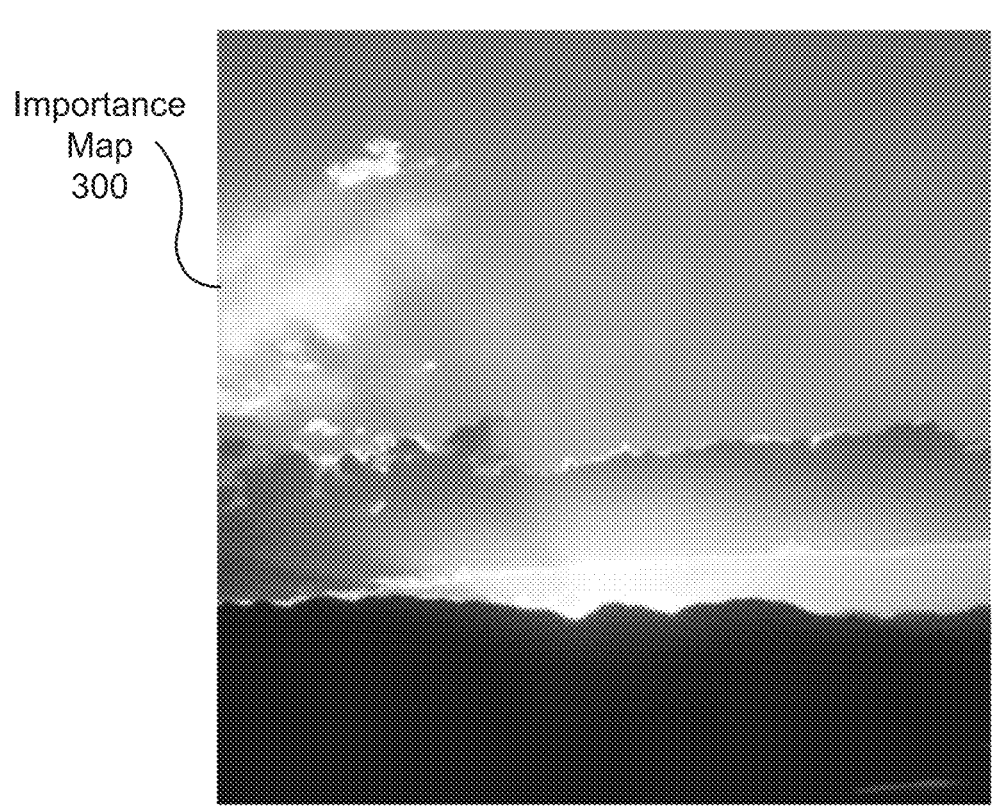
FIG. 3A illustrates an importance map and an adaptive sampling map, in accordance with an embodiment.
Figure 3A:
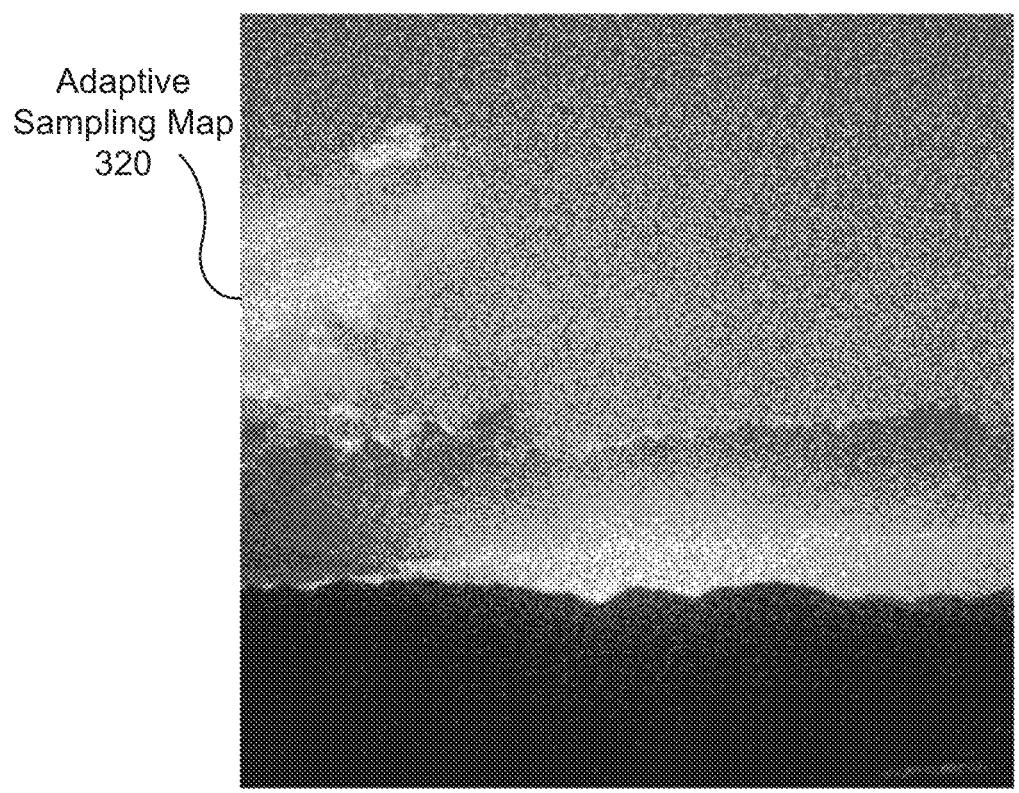

FIG. 3A illustrates an importance map 300 and an adaptive sampling map 320, in accordance with an embodiment. Brighter areas of the importance map 300 indicate pixels where more samples are needed compared with darker areas of the importance map 300. The importance map 300 may be generated by feeding variance from a denoising algorithm or an exponential weighted variance may be computed over time. In an embodiment, an importance map is generated based on gaze or eye-tracking data to concentrate samples where the user looks. The adaptive sampling map 320 is generated by using a multi-jittered random texture to quantize an initial sampling map and produce integer numbers of samples for each pixel. In an embodiment, the adaptive sampling map 320 is generated using the method 150 or 250.

Figure 3B:
FIG. 3B illustrates an adaptive sampling map, in accordance with an embodiment.

FIG. 3B illustrates an adaptive sampling map, in accordance with an embodiment. The adaptive sampling map 350 is generated by using a blue noise texture to quantize an initial sampling map and produce integer numbers of samples for each pixel. In an embodiment, the adaptive sampling map 350 is generated using the method 150 or 250.

Figure 3C:
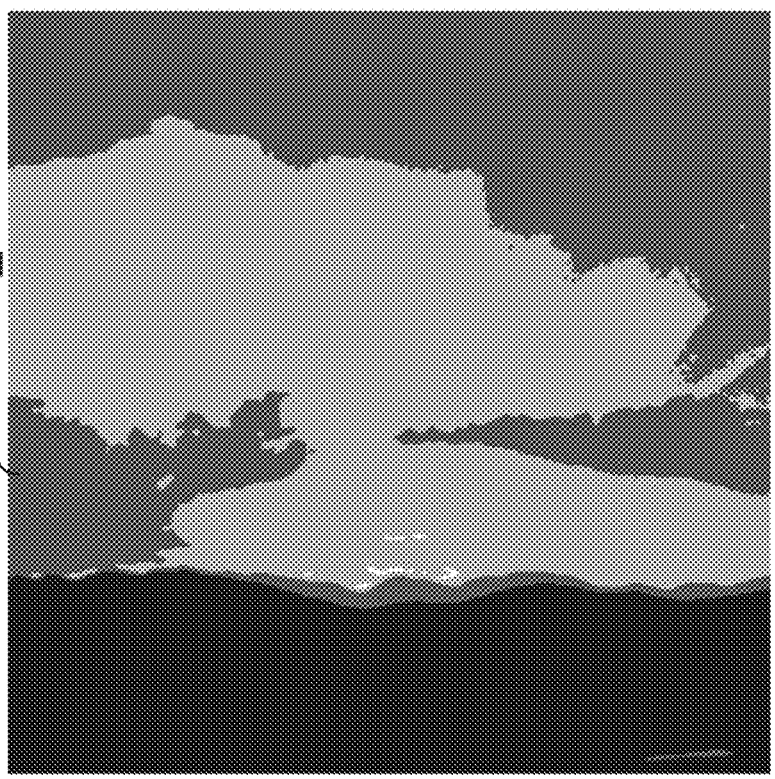
FIG. 3C illustrates a prior art sampling map generated using a prior art technique.

FIG. 3C illustrates a prior art sampling map generated using a prior art technique. A threshold-based sampling map 360 is generated using conventional techniques. The "staircased" distribution of the samples in the threshold-based sampling map 360 contrasts with the smooth distribution of the adaptive sampling maps 320 and 350. In the threshold-based sampling map 360, black corresponds to zero samples per pixel (SPP), dark gray corresponds to 1 SPP, light gray corresponds to 2 SPP, and white corresponds to 3 SPP. The thresholds that are used to quantize the floating-point sampling values are fixed for an entire image and for an image sequence. In contrast, using random values to quantize the floating-point sampling values not only produces smoother transitions between the quantized sampling values, but also may better match the per-pixel target sampling rate. In particular, when compared with the per-pixel number of samples for adaptive sampling maps produced using 3D random textures, sampling maps produced using thresholding do not typically average over time to match the input importance map 300.

The threshold-based sampling map 360 results in lower quality sample placements, which could seriously degrade rendered image quality. Additionally, the threshold-based sampling map 360 may correspond to a per-pixel number of samples that is less than or higher compared with the per-pixel target number of samples. A lower per-pixel number of samples may result in underuse of the rendering resources. A higher per-pixel number of samples may result in overuse of the rendering resources, possibly causing a target frame rate to not be met. Quantizing the per-pixel sampling values using random number produces an adaptive sampling map that, on average and over time, more closely matches the per-pixel target number of samples.

Parallel Processing Architecture

Figure 4:
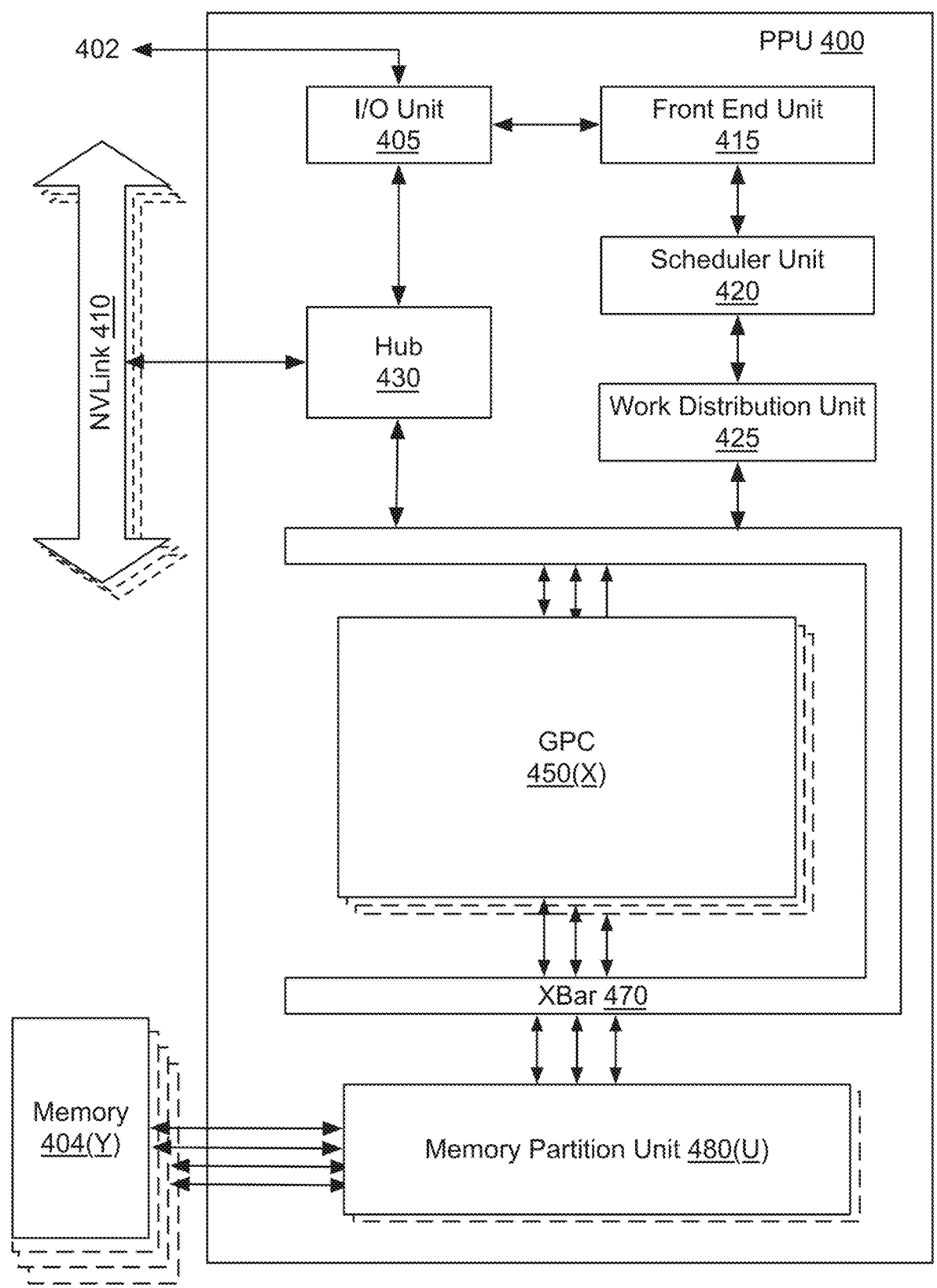
FIG. 4 illustrates an example parallel processing unit suitable for use in implementing some embodiments of the present disclosure.

FIG. 4 illustrates a parallel processing unit (PPU) 400, in accordance with an embodiment. The PPU 400 may be used to implement the adaptive sampling system 200. The PPU 400 may be used to implement one or more of the processor 225 and sampling map generation unit 220 within the adaptive sampling system 200. The PPU 400 may be configured to perform the method 150 and/or 250.

In an embodiment, the PPU 400 is a multi-threaded processor that is implemented on one or more integrated circuit devices. The PPU 400 is a latency hiding architecture designed to process many threads in parallel. A thread (e.g., a thread of execution) is an instantiation of a set of instructions configured to be executed by the PPU 400. In an embodiment, the PPU 400 is a graphics processing unit (GPU) configured to implement a graphics rendering pipeline for processing three-dimensional (3D) graphics data in order to generate two-dimensional (2D) image data for display on a display device. In other embodiments, the PPU 400 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 400 may be configured to accelerate thousands of High Performance Computing (HPC), data center, cloud computing, and machine learning applications. The PPU 400 may be configured to accelerate numerous deep learning systems and applications for autonomous vehicles, simulation, computational graphics such as ray or path tracing, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 4, the PPU 400 includes an Input/Output (I/O) unit 405, a front end unit 415, a scheduler unit 420, a work distribution unit 425, a hub 430, a crossbar (Xbar) 470, one or more general processing clusters (GPCs) 450, and one or more memory partition units 480. The PPU 400 may be connected to a host processor or other PPUs 400 via one or more high-speed NVLink 410 interconnect. The PPU 400 may be connected to a host processor or other peripheral devices via an interconnect 402. The PPU 400 may also be connected to a local memory 404 comprising a number of memory devices. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 410 interconnect enables systems to scale and include one or more PPUs 400 combined with one or more CPUs, supports cache coherence between the PPUs 400 and CPUs, and CPU mastering. Data and/or commands may be transmitted by the NVLink 410 through the hub 430 to/from other units of the PPU 400 such as one or more copy engines, a video encoder, a video decoder, a power management unit, etc. (not explicitly shown). The NVLink 410 is described in more detail in conjunction with FIG. 5B.

The I/O unit 405 is configured to transmit and receive communications (e.g., commands, data, etc.) from a host processor (not shown) over the interconnect 402. The I/O unit 405 may communicate with the host processor directly via the interconnect 402 or through one or more intermediate devices such as a memory bridge. In an embodiment, the I/O unit 405 may communicate with one or more other processors, such as one or more the PPUs 400 via the interconnect 402. In an embodiment, the I/O unit 405 implements a Peripheral Component Interconnect Express (PCIe) interface for communications over a PCIe bus and the interconnect 402 is a PCIe bus. In alternative embodiments, the I/O unit 405 may implement other types of well-known interfaces for communicating with external devices.

The I/O unit 405 decodes packets received via the interconnect 402. In an embodiment, the packets represent commands configured to cause the PPU 400 to perform various operations. The I/O unit 405 transmits the decoded commands to various other units of the PPU 400 as the commands may specify. For example, some commands may be transmitted to the front end unit 415. Other commands may be transmitted to the hub 430 or other units of the PPU 400 such as one or more copy engines, a video encoder, a video decoder, a power management unit, etc. (not explicitly shown). In other words, the I/O unit 405 is configured to route communications between and among the various logical units of the PPU 400.

In an embodiment, a program executed by the host processor encodes a command stream in a buffer that provides workloads to the PPU 400 for processing. A workload may comprise several instructions and data to be processed by those instructions. The buffer is a region in a memory that is accessible (e.g., read/write) by both the host processor and the PPU 400. For example, the I/O unit 405 may be configured to access the buffer in a system memory connected to the interconnect 402 via memory requests transmitted over the interconnect 402. In an embodiment, the host processor writes the command stream to the buffer and then transmits a pointer to the start of the command stream to the PPU 400. The front end unit 415 receives pointers to one or more command streams. The front end unit 415 manages the one or more streams, reading commands from the streams and forwarding commands to the various units of the PPU 400.

The front end unit 415 is coupled to a scheduler unit 420 that configures the various GPCs 450 to process tasks defined by the one or more streams. The scheduler unit 420 is configured to track state information related to the various tasks managed by the scheduler unit 420. The state may indicate which GPC 450 a task is assigned to, whether the task is active or inactive, a priority level associated with the task, and so forth. The scheduler unit 420 manages the execution of a plurality of tasks on the one or more GPCs 450.

The scheduler unit 420 is coupled to a work distribution unit 425 that is configured to dispatch tasks for execution on the GPCs 450. The work distribution unit 425 may track a number of scheduled tasks received from the scheduler unit 420. In an embodiment, the work distribution unit 425 manages a pending task pool and an active task pool for each of the GPCs 450. As a GPC 450 finishes the execution of a task, that task is evicted from the active task pool for the GPC 450 and one of the other tasks from the pending task pool is selected and scheduled for execution on the GPC 450. If an active task has been idle on the GPC 450, such as while waiting for a data dependency to be resolved, then the active task may be evicted from the GPC 450 and returned to the pending task pool while another task in the pending task pool is selected and scheduled for execution on the GPC 450.

In an embodiment, a host processor executes a driver kernel that implements an application programming interface (API) that enables one or more applications executing on the host processor to schedule operations for execution on the PPU 400. In an embodiment, multiple compute applications are simultaneously executed by the PPU 400 and the PPU 400 provides isolation, quality of service (QoS), and independent address spaces for the multiple compute applications. An application may generate instructions (e.g., API calls) that cause the driver kernel to generate one or more tasks for execution by the PPU 400. The driver kernel outputs tasks to one or more streams being processed by the PPU 400. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. The tasks may be allocated to one or more processing units within a GPC 450 and instructions are scheduled for execution by at least one warp.

The work distribution unit 425 communicates with the one or more GPCs 450 via XBar 470. The XBar 470 is an interconnect network that couples many of the units of the PPU 400 to other units of the PPU 400. For example, the XBar 470 may be configured to couple the work distribution unit 425 to a particular GPC 450. Although not shown explicitly, one or more other units of the PPU 400 may also be connected to the XBar 470 via the hub 430.

The tasks are managed by the scheduler unit 420 and dispatched to a GPC 450 by the work distribution unit 425. The GPC 450 is configured to process the task and generate results. The results may be consumed by other tasks within the GPC 450, routed to a different GPC 450 via the XBar 470, or stored in the memory 404. The results can be written to the memory 404 via the memory partition units 480, which implement a memory interface for reading and writing data to/from the memory 404. The results can be transmitted to another PPU 400 or CPU via the NVLink 410. In an embodiment, the PPU 400 includes a number U of memory partition units 480 that is equal to the number of separate and distinct memory devices of the memory 404 coupled to the PPU 400. Each GPC 450 may include a memory management unit to provide translation of virtual addresses into physical addresses, memory protection, and arbitration of memory requests. In an embodiment, the memory management unit provides one or more translation lookaside buffers (TLBs) for performing translation of virtual addresses into physical addresses in the memory 404.

In an embodiment, the memory partition unit 480 includes a Raster Operations (ROP) unit, a level two (L2) cache, and a memory interface that is coupled to the memory 404. The memory interface may implement 32, 64, 128, 1024-bit data buses, or the like, for high-speed data transfer. The PPU 400 may be connected to up to Y memory devices, such as high bandwidth memory stacks or graphics double-data-rate, version 5, synchronous dynamic random access memory, or other types of persistent storage. In an embodiment, the memory interface implements an HBM2 memory interface and Y equals half U. In an embodiment, the HBM2 memory stacks are located on the same physical package as the PPU 400, providing substantial power and area savings compared with conventional GDDR5 SDRAM systems. In an embodiment, each HBM2 stack includes four memory dies and Y equals 4, with each HBM2 stack including two 128-bit channels per die for a total of 8 channels and a data bus width of 1024 bits.

In an embodiment, the memory 404 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 400 process very large datasets and/or run applications for extended periods.

In an embodiment, the PPU 400 implements a multi-level memory hierarchy. In an embodiment, the memory partition unit 480 supports a unified memory to provide a single unified virtual address space for CPU and PPU 400 memory, enabling data sharing between virtual memory systems. In an embodiment the frequency of accesses by a PPU 400 to memory located on other processors is traced to ensure that memory pages are moved to the physical memory of the PPU 400 that is accessing the pages more frequently. In an embodiment, the NVLink 410 supports address translation services allowing the PPU 400 to directly access a CPU's page tables and providing full access to CPU memory by the PPU 400.

In an embodiment, copy engines transfer data between multiple PPUs 400 or between PPUs 400 and CPUs. The copy engines can generate page faults for addresses that are not mapped into the page tables. The memory partition unit 480 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 404 or other system memory may be fetched by the memory partition unit 480 and stored in the L2 cache 460, which is located on-chip and is shared between the various GPCs 450. As shown, each memory partition unit 480 includes a portion of the L2 cache associated with a corresponding memory 404. Lower level caches may then be implemented in various units within the GPCs 450. For example, each of the processing units within a GPC 450 may implement a level one (L1) cache. The L1 cache is private memory that is dedicated to a particular processing unit. The L2 cache 460 is coupled to the memory interface 470 and the XBar 470 and data from the L2 cache may be fetched and stored in each of the L1 caches for processing.

In an embodiment, the processing units within each GPC 450 implement a SIMD (Single-Instruction, Multiple-Data) architecture where each thread in a group of threads (e.g., a warp) is configured to process a different set of data based on the same set of instructions. All threads in the group of threads execute the same instructions. In another embodiment, the processing unit implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

Each processing unit includes a large number (e.g., 128, etc.) of distinct processing cores (e.g., functional units) that may be fully-pipelined, single-precision, double-precision, and/or mixed precision and include a floating point arithmetic logic unit and an integer arithmetic logic unit. In an embodiment, the floating point arithmetic logic units implement the IEEE 754-2008 standard for floating point arithmetic. In an embodiment, the cores include 64 single-precision (32-bit) floating point cores, 64 integer cores, 32 double-precision (64-bit) floating point cores, and 8 tensor cores.

Tensor cores configured to perform matrix operations. In particular, the tensor cores are configured to perform deep learning matrix arithmetic, such as GEMM (matrix-matrix multiplication) for convolution operations during neural network training and inferencing. In an embodiment, each tensor core operates on a 4×4 matrix and performs a matrix multiply and accumulate operation $D=A\times B+C$, where A, B, C, and D are 4×4 matrices.

In an embodiment, the matrix multiply inputs A and B may be integer, fixed-point, or floating point matrices, while the accumulation matrices C and D may be integer, fixed-point, or floating point matrices of equal or higher bitwidths. In an embodiment, tensor cores operate on one, four, or eight bit integer input data with 32-bit integer accumulation. The 8-bit integer matrix multiply requires 1024 operations and results in a full precision product that is then accumulated using 32-bit integer addition with the other intermediate products for a 8×8×16 matrix multiply. In an embodiment, tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each processing unit may also comprise M special function units (SFUs) that perform special functions (e.g., attribute evaluation, reciprocal square root, and the like). In an embodiment, the SFUs may include a tree traversal unit configured to traverse a hierarchical tree data structure. In an embodiment, the SFUs may include texture unit configured to perform texture map filtering operations. In an embodiment, the texture units are configured to load texture maps (e.g., a 2D array of texels) from the memory 404 and sample the texture maps to produce sampled texture values for use in shader programs executed by the processing unit. In an embodiment, the texture maps are stored in shared memory that may comprise or include an L1 cache. The texture units implement texture operations such as filtering operations using mip-maps (e.g., texture maps of varying levels of detail). In an embodiment, each processing unit includes two texture units.

Each processing unit also comprises N load store units (LSUs) that implement load and store operations between the shared memory and the register file. Each processing unit includes an interconnect network that connects each of the cores to the register file and the LSU to the register file, shared memory. In an embodiment, the interconnect network is a crossbar that can be configured to connect any of the cores to any of the registers in the register file and connect the LSUs to the register file and memory locations in shared memory.

The shared memory is an array of on-chip memory that allows for data storage and communication between the processing units and between threads within a processing unit. In an embodiment, the shared memory comprises 128 KB of storage capacity and is in the path from each of the processing units to the memory partition unit 480. The shared memory can be used to cache reads and writes. One or more of the shared memory, L1 cache, L2 cache, and memory 404 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory enables the shared memory to function as a high-throughput conduit for streaming data while simultaneously providing high-bandwidth and low-latency access to frequently reused data.

When configured for general purpose parallel computation, a simpler configuration can be used compared with graphics processing. Specifically, fixed function graphics processing units, are bypassed, creating a much simpler programming model. In the general purpose parallel computation configuration, the work distribution unit 425 assigns and distributes blocks of threads directly to the processing units within the GPCs 450. Threads execute the same program, using a unique thread ID in the calculation to ensure each thread generates unique results, using the processing unit(s) to execute the program and perform calculations, shared memory to communicate between threads, and the LSU to read and write global memory through the shared memory and the memory partition unit 480. When configured for general purpose parallel computation, the processing units can also write commands that the scheduler unit 420 can use to launch new work on the processing units.

The PPUs 400 may each include, and/or be configured to perform functions of, one or more processing cores and/or components thereof, such as Tensor Cores (TCs), Tensor Processing Units (TPUs), Pixel Visual Cores (PVCs), Ray Tracing (RT) Cores, Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The PPU 400 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 400 is embodied on a single semiconductor substrate. In another embodiment, the PPU 400 is included in a system-on-a-chip (SoC) along with one or more other devices such as additional PPUs 400, the memory 404, a reduced instruction set computer (RISC) CPU, a memory management unit (MMU), a digital-to-analog converter (DAC), and the like.

In an embodiment, the PPU 400 may be included on a graphics card that includes one or more memory devices. The graphics card may be configured to interface with a PCIe slot on a motherboard of a desktop computer. In yet another embodiment, the PPU 400 may be an integrated graphics processing unit (iGPU) or parallel processor included in the chipset of the motherboard. In yet another embodiment, the PPU 400 may be realized in reconfigurable hardware. In yet another embodiment, parts of the PPU 400 may be realized in reconfigurable hardware.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5A:
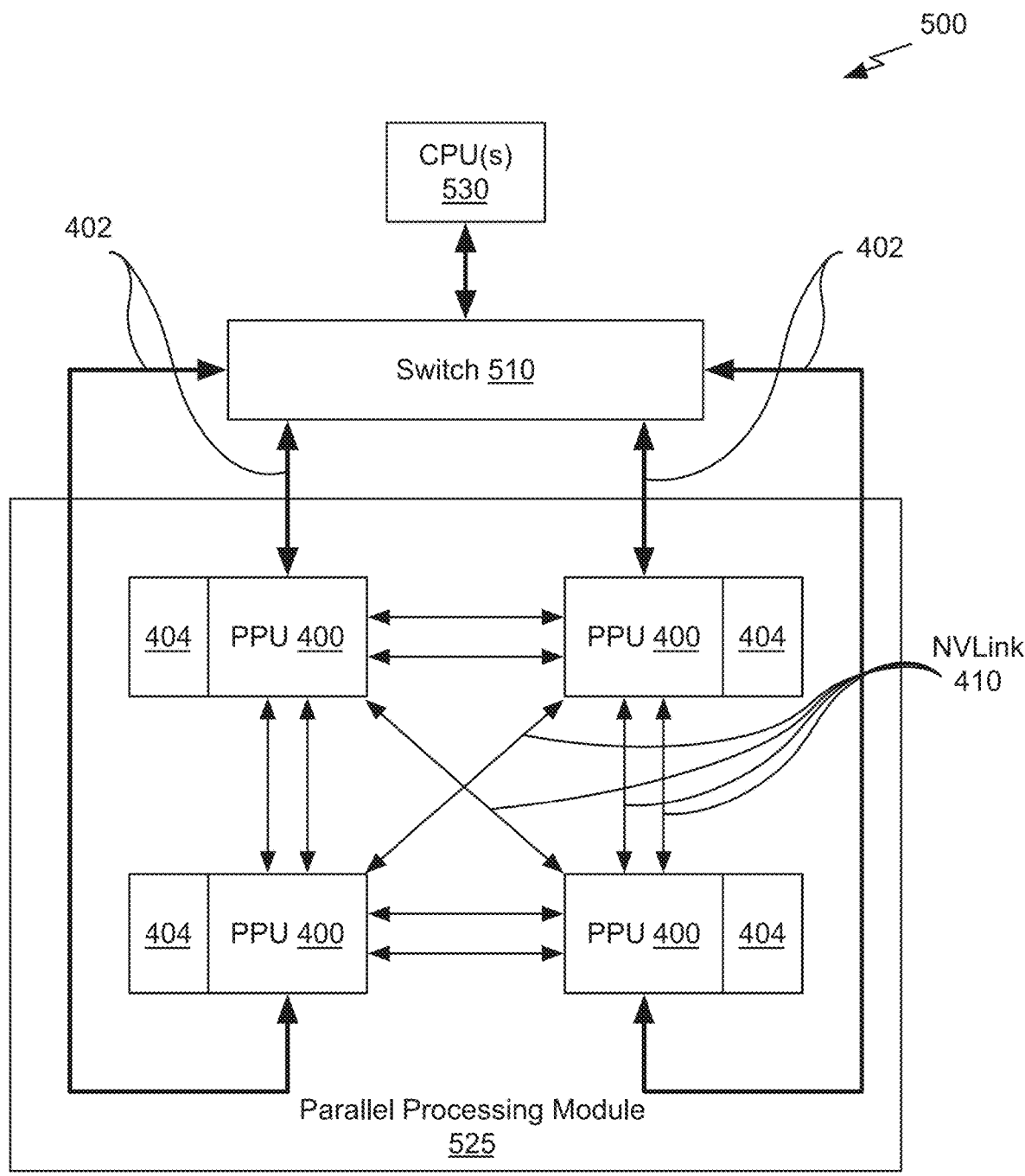
FIG. 5A is a conceptual diagram of a processing system implemented using the PPU of FIG. 4, suitable for use in implementing some embodiments of the present disclosure.

FIG. 5A is a conceptual diagram of a processing system 500 implemented using the PPU 400 of FIG. 4, in accordance with an embodiment. The exemplary system 565 may be configured to implement the method 150 shown in FIG. 1F, the method 240 shown in FIG. 2B, and/or the method 250 shown in FIG. 2C. The processing system 500 includes a CPU 530, switch 510, and multiple PPUs 400, and respective memories 404.

Figure 5B:
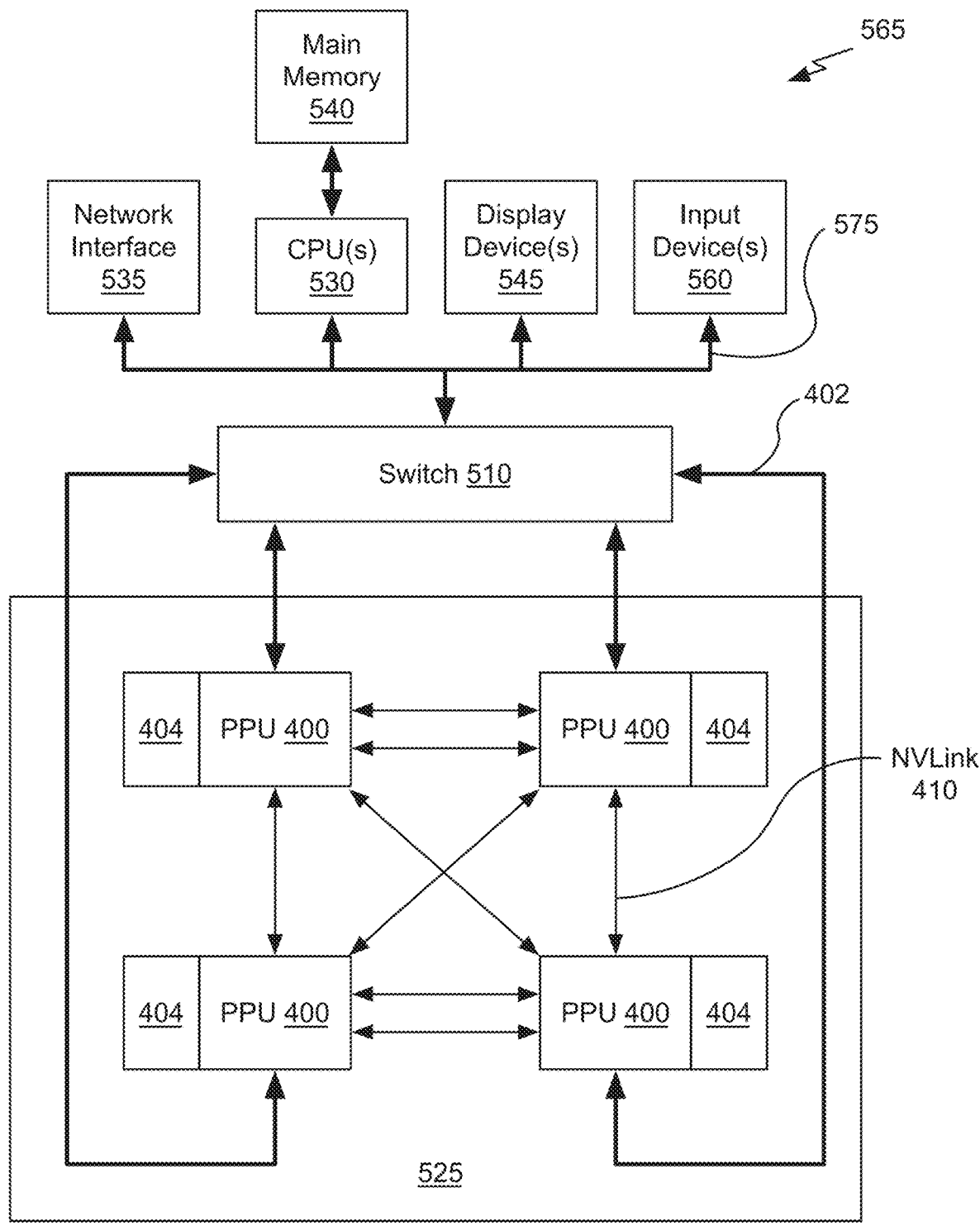
FIG. 5B illustrates an exemplary system in which the various architecture and/or functionality of the various previous embodiments may be implemented.

The NVLink 410 provides high-speed communication links between each of the PPUs 400. Although a particular number of NVLink 410 and interconnect 402 connections are illustrated in FIG. 5B, the number of connections to each PPU 400 and the CPU 530 may vary. The switch 510 interfaces between the interconnect 402 and the CPU 530. The PPUs 400, memories 404, and NVLinks 410 may be situated on a single semiconductor platform to form a parallel processing module 525. In an embodiment, the switch 510 supports two or more protocols to interface between various different connections and/or links.

In another embodiment (not shown), the NVLink 410 provides one or more high-speed communication links between each of the PPUs 400 and the CPU 530 and the switch 510 interfaces between the interconnect 402 and each of the PPUs 400. The PPUs 400, memories 404, and interconnect 402 may be situated on a single semiconductor platform to form a parallel processing module 525. In yet another embodiment (not shown), the interconnect 402 provides one or more communication links between each of the PPUs 400 and the CPU 530 and the switch 510 interfaces between each of the PPUs 400 using the NVLink 410 to provide one or more high-speed communication links between the PPUs 400. In another embodiment (not shown), the NVLink 410 provides one or more high-speed communication links between the PPUs 400 and the CPU 530 through the switch 510. In yet another embodiment (not shown), the interconnect 402 provides one or more communication links between each of the PPUs 400 directly. One or more of the NVLink 410 high-speed communication links may be implemented as a physical NVLink interconnect or either an on-chip or on-die interconnect using the same protocol as the NVLink 410.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 400 and/or memories 404 may be packaged devices. In an embodiment, the CPU 530, switch 510, and the parallel processing module 525 are situated on a single semiconductor platform.

In an embodiment, the signaling rate of each NVLink 410 is 20 to 25 Gigabits/second and each PPU 400 includes six NVLink 410 interfaces (as shown in FIG. 5A, five NVLink 410 interfaces are included for each PPU 400). Each NVLink 410 provides a data transfer rate of 25 Gigabytes/second in each direction, with six links providing 400 Gigabytes/second. The NVLinks 410 can be used exclusively for PPU-to-PPU communication as shown in FIG. 5A, or some combination of PPU-to-PPU and PPU-to-CPU, when the CPU 530 also includes one or more NVLink 410 interfaces.

In an embodiment, the NVLink 410 allows direct load/store/atomic access from the CPU 530 to each PPU's 400 memory 404. In an embodiment, the NVLink 410 supports coherency operations, allowing data read from the memories 404 to be stored in the cache hierarchy of the CPU 530, reducing cache access latency for the CPU 530. In an embodiment, the NVLink 410 includes support for Address Translation Services (ATS), allowing the PPU 400 to directly access page tables within the CPU 530. One or more of the NVLinks 410 may also be configured to operate in a low-power mode.

FIG. 5B illustrates an exemplary system 565 in which the various architecture and/or functionality of the various previous embodiments may be implemented. The exemplary system 565 may be configured to implement the method 150 shown in FIG. 1F, the method 240 shown in FIG. 2B, and/or the method 250 shown in FIG. 2C.

As shown, a system 565 is provided including at least one central processing unit 530 that is connected to a communication bus 575. The communication bus 575 may directly or indirectly couple one or more of the following devices: main memory 540, network interface 535, CPU(s) 530, display device(s) 545, input device(s) 560, switch 510, and parallel processing system 525. The communication bus 575 may be implemented using any suitable protocol and may represent one or more links or busses, such as an address bus, a data bus, a control bus, or a combination thereof. The communication bus 575 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, HyperTransport, and/or another type of bus or link. In some embodiments, there are direct connections between components. As an example, the CPU(s) 530 may be directly connected to the main memory 540. Further, the CPU(s) 530 may be directly connected to the parallel processing system 525. Where there is direct, or point-to-point connection between components, the communication bus 575 may include a PCIe link to carry out the connection. In these examples, a PCI bus need not be included in the system 565.

Figure 5C:
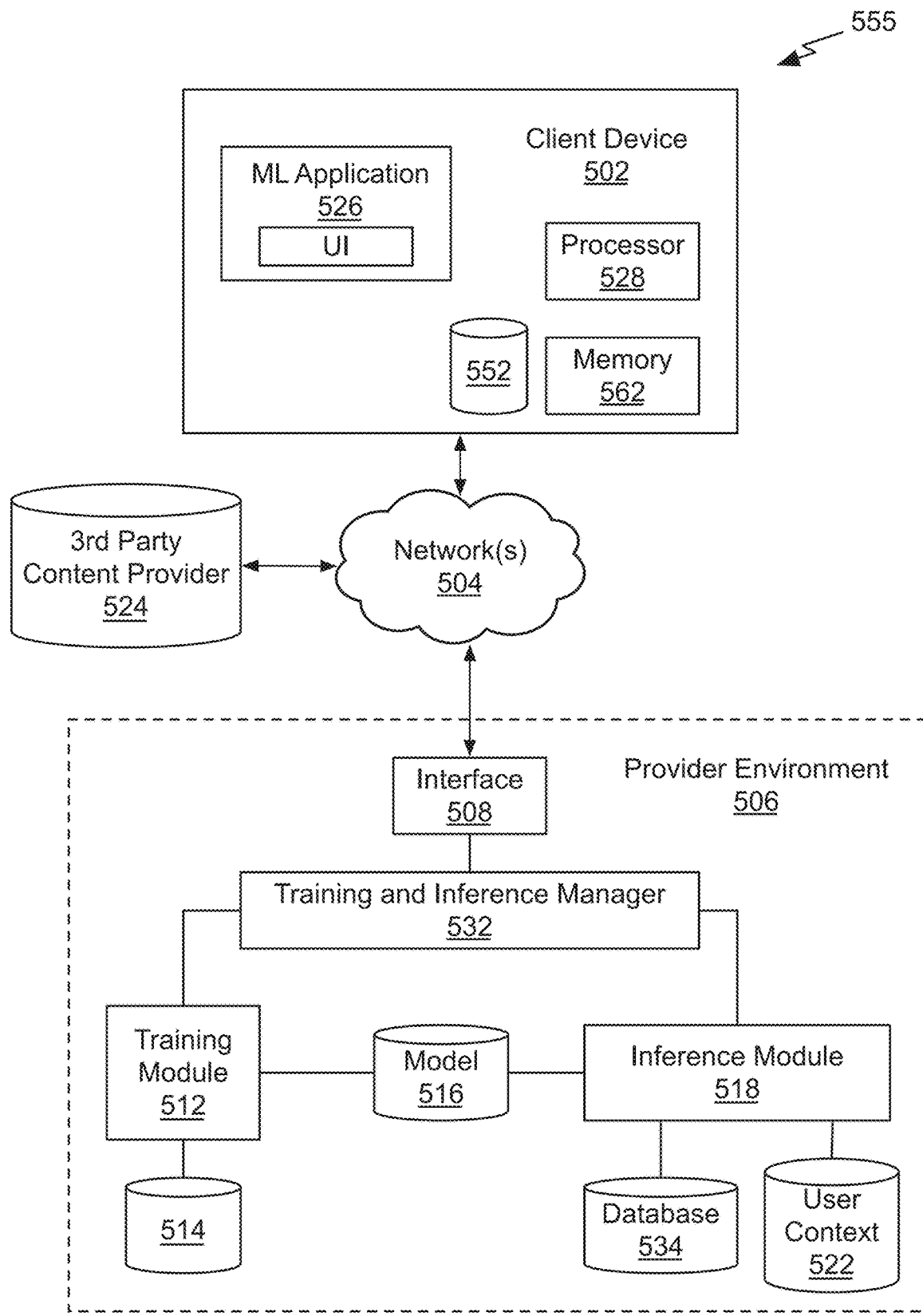
FIG. 5C illustrates components of an exemplary system that can be used to train and utilize machine learning, in at least one embodiment.

Although the various blocks of FIG. 5C are shown as connected via the communication bus 575 with lines, this is not intended to be limiting and is for clarity only. For example, in some embodiments, a presentation component, such as display device(s) 545, may be considered an I/O component, such as input device(s) 560 (e.g., if the display is a touch screen). As another example, the CPU(s) 530 and/or parallel processing system 525 may include memory (e.g., the main memory 540 may be representative of a storage device in addition to the parallel processing system 525, the CPUs 530, and/or other components). In other words, the computing device of FIG. 5C is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 5C.

The system 565 also includes a main memory 540. Control logic (software) and data are stored in the main memory 540 which may take the form of a variety of computer-readable media. The computer-readable media may be any available media that may be accessed by the system 565. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the main memory 540 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by system 565. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

Computer programs, when executed, enable the system 565 to perform various functions. The CPU(s) 530 may be configured to execute at least some of the computer-readable instructions to control one or more components of the system 565 to perform one or more of the methods and/or processes described herein. The CPU(s) 530 may each include one or more cores (e.g., one, two, four, eight, twenty-eight, seventy-two, etc.) that are capable of handling a multitude of software threads simultaneously. The CPU(s) 530 may include any type of processor, and may include different types of processors depending on the type of system 565 implemented (e.g., processors with fewer cores for mobile devices and processors with more cores for servers). For example, depending on the type of system 565, the processor may be an Advanced RISC Machines (ARM) processor implemented using Reduced Instruction Set Computing (RISC) or an x86 processor implemented using Complex Instruction Set Computing (CISC). The system 565 may include one or more CPUs 530 in addition to one or more microprocessors or supplementary co-processors, such as math co-processors.

In addition to or alternatively from the CPU(s) 530, the parallel processing module 525 may be configured to execute at least some of the computer-readable instructions to control one or more components of the system 565 to perform one or more of the methods and/or processes described herein. The parallel processing module 525 may be used by the system 565 to render graphics (e.g., 3D graphics) or perform general purpose computations. For example, the parallel processing module 525 may be used for General-Purpose computing on GPUs (GPGPU). In embodiments, the CPU(s) 530 and/or the parallel processing module 525 may discretely or jointly perform any combination of the methods, processes and/or portions thereof.

The system 565 also includes input device(s) 560, the parallel processing system 525, and display device(s) 545. The display device(s) 545 may include a display (e.g., a monitor, a touch screen, a television screen, a heads-up-display (HUD), other display types, or a combination thereof), speakers, and/or other presentation components. The display device(s) 545 may receive data from other components (e.g., the parallel processing system 525, the CPU(s) 530, etc.), and output the data (e.g., as an image, video, sound, etc.).

The network interface 535 may enable the system 565 to be logically coupled to other devices including the input devices 560, the display device(s) 545, and/or other components, some of which may be built in to (e.g., integrated in) the system 565. Illustrative input devices 560 include a microphone, mouse, keyboard, joystick, game pad, game controller, satellite dish, scanner, printer, wireless device, etc. The input devices 560 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the system 565. The system 565 may be include depth cameras, such as stereoscopic camera systems, infrared camera systems, RGB camera systems, touchscreen technology, and combinations of these, for gesture detection and recognition. Additionally, the system 565 may include accelerometers or gyroscopes (e.g., as part of an inertia measurement unit (IMU)) that enable detection of motion. In some examples, the output of the accelerometers or gyroscopes may be used by the system 565 to render immersive augmented reality or virtual reality.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes. The system 565 may be included within a distributed network and/or cloud computing environment.

The network interface 535 may include one or more receivers, transmitters, and/or transceivers that enable the system 565 to communicate with other computing devices via an electronic communication network, included wired and/or wireless communications. The network interface 535 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The system 565 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. The system 565 may also include a hard-wired power supply, a battery power supply, or a combination thereof (not shown). The power supply may provide power to the system 565 to enable the components of the system 565 to operate.

Each of the foregoing modules and/or devices may even be situated on a single semiconductor platform to form the system 565. Alternately, the various modules may also be situated separately or in various combinations of semiconductor platforms per the desires of the user. While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the processing system 500 of FIG. 5A and/or exemplary system 565 of FIG. 5B—e.g., each device may include similar components, features, and/or functionality of the processing system 500 and/or exemplary system 565.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example processing system 500 of FIG. 5B and/or exemplary system 565 of FIG. 5C. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Machine Learning

Deep neural networks (DNNs) developed on processors, such as the PPU 400 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 400. Inferencing is less compute-intensive than training, being a latency-sensitive process where a trained neural network is applied to new inputs it has not seen before to classify images, detect emotions, identify recommendations, recognize and translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 400 is a computing platform capable of delivering performance required for deep neural network-based artificial intelligence and machine learning applications.

Furthermore, images generated applying one or more of the techniques disclosed herein may be used to train, test, or certify DNNs used to recognize objects and environments in the real world. Such images may include scenes of roadways, factories, buildings, urban settings, rural settings, humans, animals, and any other physical object or real-world setting. Such images may be used to train, test, or certify DNNs that are employed in machines or robots to manipulate, handle, or modify physical objects in the real world. Furthermore, such images may be used to train, test, or certify DNNs that are employed in autonomous vehicles to navigate and move the vehicles through the real world. Additionally, images generated applying one or more of the techniques disclosed herein may be used to convey information to users of such machines, robots, and vehicles.

FIG. 5C illustrates components of an exemplary system 555 that can be used to train and utilize machine learning, in accordance with at least one embodiment. As will be discussed, various components can be provided by various combinations of computing devices and resources, or a single computing system, which may be under control of a single entity or multiple entities. Further, aspects may be triggered, initiated, or requested by different entities. In at least one embodiment training of a neural network might be instructed by a provider associated with provider environment 506, while in at least one embodiment training might be requested by a customer or other user having access to a provider environment through a client device 502 or other such resource. In at least one embodiment, training data (or data to be analyzed by a trained neural network) can be provided by a provider, a user, or a third party content provider 524. In at least one embodiment, client device 502 may be a vehicle or object that is to be navigated on behalf of a user, for example, which can submit requests and/or receive instructions that assist in navigation of a device.

In at least one embodiment, requests are able to be submitted across at least one network 504 to be received by a provider environment 506. In at least one embodiment, a client device may be any appropriate electronic and/or computing devices enabling a user to generate and send such requests, such as, but not limited to, desktop computers, notebook computers, computer servers, smartphones, tablet computers, gaming consoles (portable or otherwise), computer processors, computing logic, and set-top boxes. Network(s) 504 can include any appropriate network for transmitting a request or other such data, as may include Internet, an intranet, an Ethernet, a cellular network, a local area network (LAN), a wide area network (WAN), a personal area network (PAN), an ad hoc network of direct wireless connections among peers, and so on.

In at least one embodiment, requests can be received at an interface layer 508, which can forward data to a training and inference manager 532, in this example. The training and inference manager 532 can be a system or service including hardware and software for managing requests and service corresponding data or content, in at least one embodiment, the training and inference manager 532 can receive a request to train a neural network, and can provide data for a request to a training module 512. In at least one embodiment, training module 512 can select an appropriate model or neural network to be used, if not specified by the request, and can train a model using relevant training data. In at least one embodiment, training data can be a batch of data stored in a training data repository 514, received from client device 502, or obtained from a third party provider 524. In at least one embodiment, training module 512 can be responsible for training data. A neural network can be any appropriate network, such as a recurrent neural network (RNN) or convolutional neural network (CNN). Once a neural network is trained and successfully evaluated, a trained neural network can be stored in a model repository 516, for example, that may store different models or networks for users, applications, or services, etc. In at least one embodiment, there may be multiple models for a single application or entity, as may be utilized based on a number of different factors.

In at least one embodiment, at a subsequent point in time, a request may be received from client device 502 (or another such device) for content (e.g., path determinations) or data that is at least partially determined or impacted by a trained neural network. This request can include, for example, input data to be processed using a neural network to obtain one or more inferences or other output values, classifications, or predictions, or for at least one embodiment, input data can be received by interface layer 508 and directed to inference module 518, although a different system or service can be used as well. In at least one embodiment, inference module 518 can obtain an appropriate trained network, such as a trained deep neural network (DNN) as discussed herein, from model repository 516 if not already stored locally to inference module 518. Inference module 518 can provide data as input to a trained network, which can then generate one or more inferences as output. This may include, for example, a classification of an instance of input data. In at least one embodiment, inferences can then be transmitted to client device 502 for display or other communication to a user. In at least one embodiment, context data for a user may also be stored to a user context data repository 522, which may include data about a user which may be useful as input to a network in generating inferences, or determining data to return to a user after obtaining instances. In at least one embodiment, relevant data, which may include at least some of input or inference data, may also be stored to a local database 534 for processing future requests. In at least one embodiment, a user can use account information or other information to access resources or functionality of a provider environment. In at least one embodiment, if permitted and available, user data may also be collected and used to further train models, in order to provide more accurate inferences for future requests. In at least one embodiment, requests may be received through a user interface to a machine learning application 526 executing on client device 502, and results displayed through a same interface. A client device can include resources such as a processor 528 and memory 562 for generating a request and processing results or a response, as well as at least one data storage element 552 for storing data for machine learning application 526.

In at least one embodiment a processor 528 (or a processor of training module 512 or inference module 518) will be a central processing unit (CPU). As mentioned, however, resources in such environments can utilize GPUs to process data for at least certain types of requests. With thousands of cores, GPUs, such as PPU 300 are designed to handle substantial parallel workloads and, therefore, have become popular in deep learning for training neural networks and generating predictions. While use of GPUs for offline builds has enabled faster training of larger and more complex models, generating predictions offline implies that either request-time input features cannot be used or predictions must be generated for all permutations of features and stored in a lookup table to serve real-time requests. If a deep learning framework supports a CPU-mode and a model is small and simple enough to perform a feed-forward on a CPU with a reasonable latency, then a service on a CPU instance could host a model. In this case, training can be done offline on a GPU and inference done in real-time on a CPU. If a CPU approach is not viable, then a service can run on a GPU instance. Because GPUs have different performance and cost characteristics than CPUs, however, running a service that offloads a runtime algorithm to a GPU can require it to be designed differently from a CPU based service.

In at least one embodiment, video data can be provided from client device 502 for enhancement in provider environment 506. In at least one embodiment, video data can be processed for enhancement on client device 502. In at least one embodiment, video data may be streamed from a third party content provider 524 and enhanced by third party content provider 524, provider environment 506, or client device 502. In at least one embodiment, video data can be provided from client device 502 for use as training data in provider environment 506.

In at least one embodiment, supervised and/or unsupervised training can be performed by the client device 502 and/or the provider environment 506. In at least one embodiment, a set of training data 514 (e.g., classified or labeled data) is provided as input to function as training data. In at least one embodiment, training data can include instances of at least one type of object for which a neural network is to be trained, as well as information that identifies that type of object. In at least one embodiment, training data might include a set of images that each includes a representation of a type of object, where each image also includes, or is associated with, a label, metadata, classification, or other piece of information identifying a type of object represented in a respective image. Various other types of data may be used as training data as well, as may include text data, audio data, video data, and so on. In at least one embodiment, training data 514 is provided as training input to a training module 512. In at least one embodiment, training module 512 can be a system or service that includes hardware and software, such as one or more computing devices executing a training application, for training a neural network (or other model or algorithm, etc.). In at least one embodiment, training module 512 receives an instruction or request indicating a type of model to be used for training, in at least one embodiment, a model can be any appropriate statistical model, network, or algorithm useful for such purposes, as may include an artificial neural network, deep learning algorithm, learning classifier, Bayesian network, and so on. In at least one embodiment, training module 512 can select an initial model, or other untrained model, from an appropriate repository 516 and utilize training data 514 to train a model, thereby generating a trained model (e.g., trained deep neural network) that can be used to classify similar types of data, or generate other such inferences. In at least one embodiment where training data is not used, an appropriate initial model can still be selected for training on input data per training module 512.

In at least one embodiment, a model can be trained in a number of different ways, as may depend in part upon a type of model selected. In at least one embodiment, a machine learning algorithm can be provided with a set of training data, where a model is a model artifact created by a training process. In at least one embodiment, each instance of training data contains a correct answer (e.g., classification), which can be referred to as a target or target attribute. In at least one embodiment, a learning algorithm finds patterns in training data that map input data attributes to a target, an answer to be predicted, and a machine learning model is output that captures these patterns. In at least one embodiment, a machine learning model can then be used to obtain predictions on new data for which a target is not specified.

In at least one embodiment, training and inference manager 532 can select from a set of machine learning models including binary classification, multiclass classification, generative, and regression models. In at least one embodiment, a type of model to be used can depend at least in part upon a type of target to be predicted.

Graphics Processing Pipeline

In an embodiment, the PPU 400 comprises a graphics processing unit (GPU). The PPU 400 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 400 can be configured to process the graphics primitives to generate a frame buffer (e.g., pixel data for each of the pixels of the display).

An application writes model data for a scene (e.g., a collection of vertices and attributes) to a memory such as a system memory or memory 404. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the processing units within the PPU 400 including one or more of a vertex shader, hull shader, domain shader, geometry shader, and a pixel shader. For example, one or more of the processing units may be configured to execute a vertex shader program that processes a number of vertices defined by the model data. In an embodiment, the different processing units may be configured to execute different shader programs concurrently. For example, a first subset of processing units may be configured to execute a vertex shader program while a second subset of processing units may be configured to execute a pixel shader program. The first subset of processing units processes vertex data to produce processed vertex data and writes the processed vertex data to the L2 cache 460 and/or the memory 404. After the processed vertex data is rasterized (e.g., transformed from three-dimensional data into two-dimensional data in screen space) to produce fragment data, the second subset of processing units executes a pixel shader to produce processed fragment data, which is then blended with other processed fragment data and written to the frame buffer in memory 404. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6A:
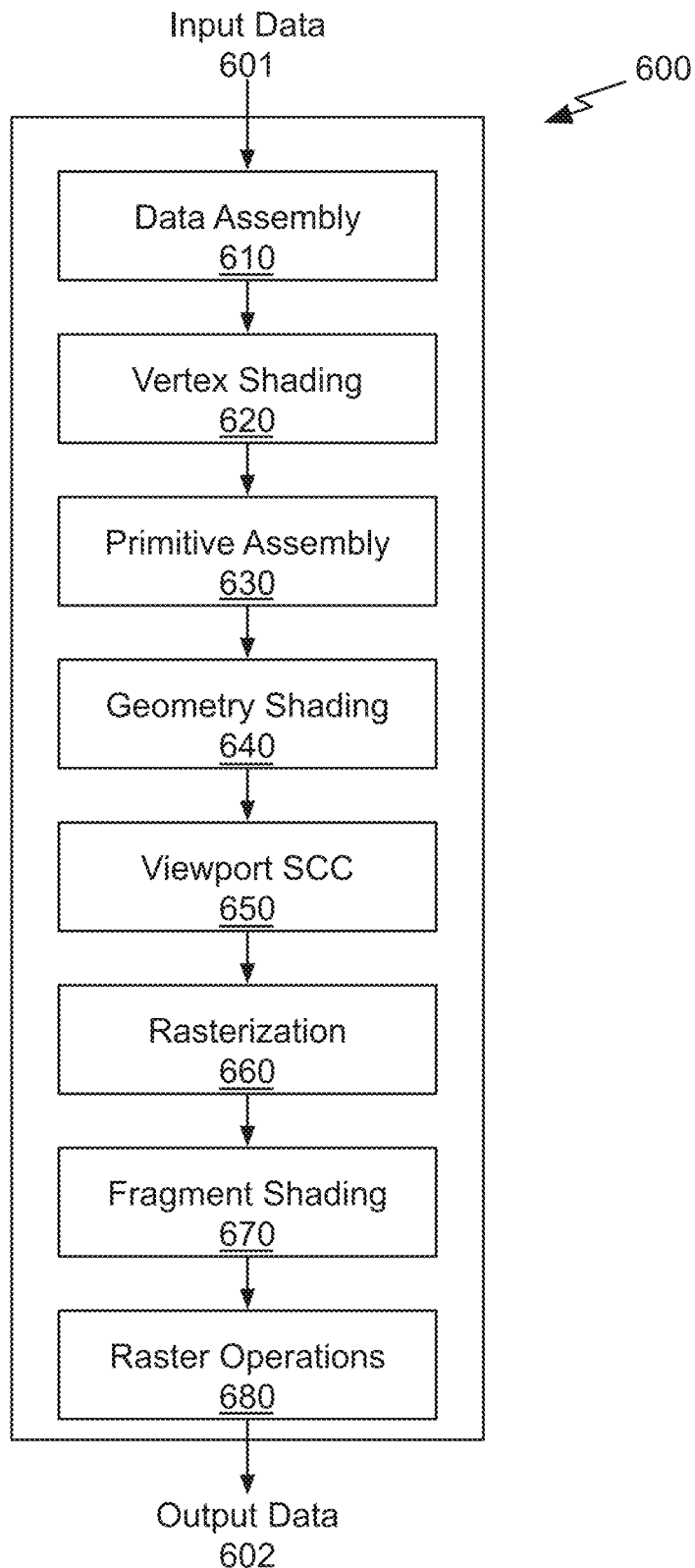
FIG. 6A is a conceptual diagram of a graphics processing pipeline implemented by the PPU of FIG. 4 suitable for use in implementing some embodiments of the present disclosure.

FIG. 6A is a conceptual diagram of a graphics processing pipeline 600 implemented by the PPU 400 of FIG. 4, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6A, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (e.g., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (e.g., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (e.g., a collection of associated vertices) to the geometry shading stage 640.

The geometry shading stage 640 processes geometric primitives by performing a set of operations (e.g., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (e.g., interpolated vertex attributes associated with a particular sample location for each covered pixel) that are transmitted to the fragment shading stage 670.

The fragment shading stage 670 processes fragment data by performing a set of operations (e.g., a fragment shader or a program) on each of the fragments. The fragment shading stage 670 may generate pixel data (e.g., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (e.g., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640). Other types of graphics processing pipelines are contemplated as being within the scope of the present disclosure. Furthermore, any of the stages of the graphics processing pipeline 600 may be implemented by one or more dedicated hardware units within a graphics processor such as PPU 400. Other stages of the graphics processing pipeline 600 may be implemented by programmable hardware units such as the processing unit within the PPU 400.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 400. The API provides an abstraction for a programmer that lets a programmer utilize specialized graphics hardware, such as the PPU 400, to generate the graphical data without requiring the programmer to utilize the specific instruction set for the PPU 400. The application may include an API call that is routed to the device driver for the PPU 400. The device driver interprets the API call and performs various operations to respond to the API call. In some instances, the device driver may perform operations by executing instructions on the CPU. In other instances, the device driver may perform operations, at least in part, by launching operations on the PPU 400 utilizing an input/output interface between the CPU and the PPU 400. In an embodiment, the device driver is configured to implement the graphics processing pipeline 600 utilizing the hardware of the PPU 400.

Various programs may be executed within the PPU 400 in order to implement the various stages of the graphics processing pipeline 600. For example, the device driver may launch a kernel on the PPU 400 to perform the vertex shading stage 620 on one processing unit (or multiple processing units). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on a processing unit.

Images generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server, a data center, or in a cloud-based computing environment and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA GeForce Now (GFN), Google Stadia, and the like.

Example Streaming System

Figure 6B:
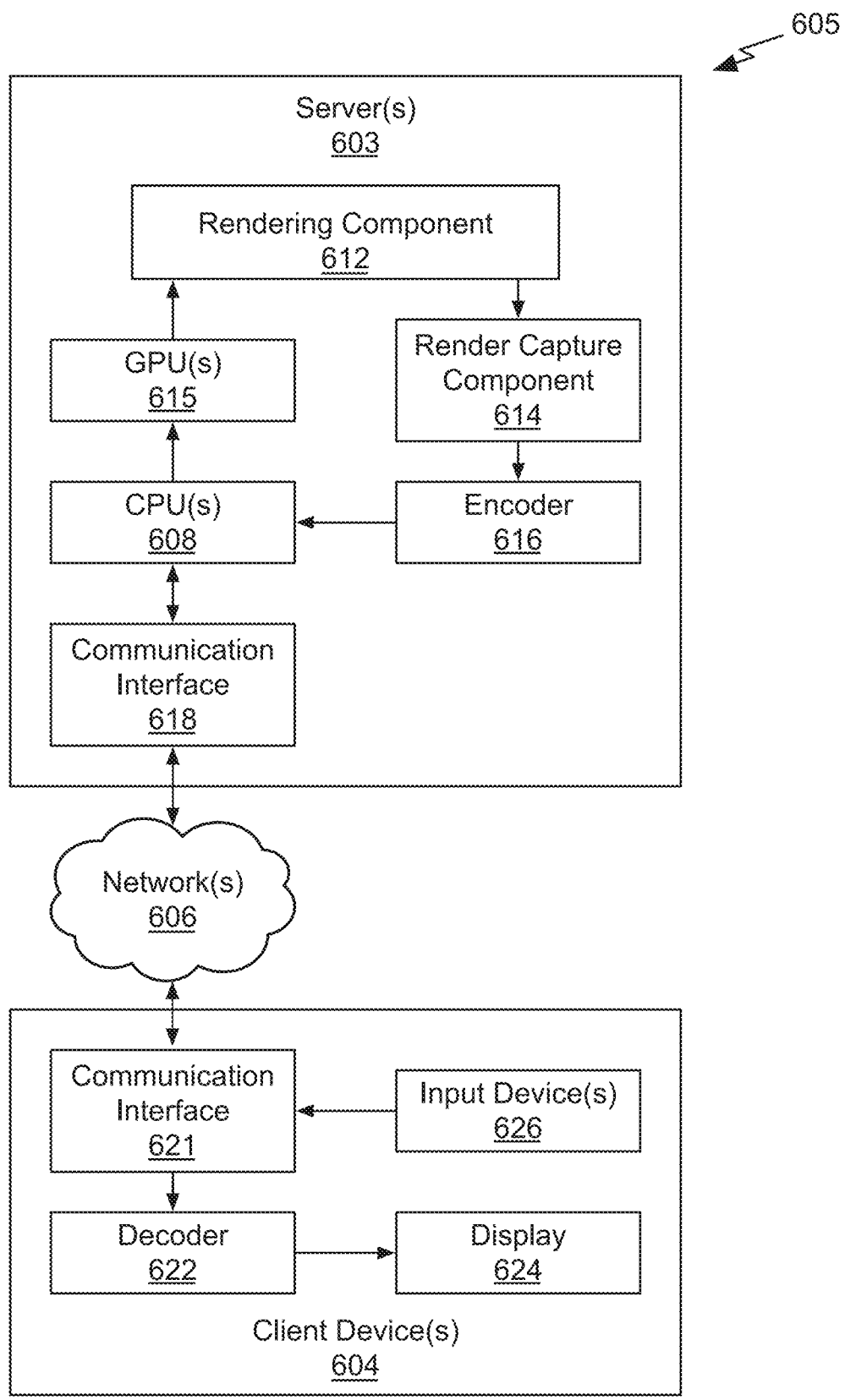
FIG. 6B illustrates an exemplary streaming system suitable for use in implementing some embodiments of the present disclosure.

FIG. 6B is an example system diagram for a streaming system 605, in accordance with some embodiments of the present disclosure. In an embodiment, the streaming system 605 is a game streaming system. FIG. 6B includes server(s) 603 (which may include similar components, features, and/or functionality to the example processing system 500 of FIG. 5A and/or exemplary system 565 of FIG. 5B), client device(s) 604 (which may include similar components, features, and/or functionality to the example processing system 500 of FIG. 5A and/or exemplary system 565 of FIG. 5B), and network(s) 606 (which may be similar to the network(s) described herein). In some embodiments of the present disclosure, the system 605 may be implemented.

In the system 605, for a game session, the client device(s) 604 may only receive input data in response to inputs to the input device(s), transmit the input data to the server(s) 603, receive encoded display data from the server(s) 603, and display the display data on the display 624. As such, the more computationally intense computing and processing is offloaded to the server(s) 603 (e.g., rendering—in particular ray or path tracing—for graphical output of the game session is executed by the GPU(s) of the server(s) 603). In other words, the game session is streamed to the client device(s) 604 from the server(s) 603, thereby reducing the requirements of the client device(s) 604 for graphics processing and rendering.

For example, with respect to an instantiation of a game session, a client device 604 may be displaying a frame of the game session on the display 624 based on receiving the display data from the server(s) 603. The client device 604 may receive an input to one of the input device(s) and generate input data in response. The client device 604 may transmit the input data to the server(s) 603 via the communication interface 621 and over the network(s) 606 (e.g., the Internet), and the server(s) 603 may receive the input data via the communication interface 618. The CPU(s) may receive the input data, process the input data, and transmit data to the GPU(s) that causes the GPU(s) to generate a rendering of the game session. For example, the input data may be representative of a movement of a character of the user in a game, firing a weapon, reloading, passing a ball, turning a vehicle, etc. The rendering component 612 may render the game session (e.g., representative of the result of the input data) and the render capture component 614 may capture the rendering of the game session as display data (e.g., as image data capturing the rendered frame of the game session). The rendering of the game session may include ray or path-traced lighting and/or shadow effects, computed using one or more parallel processing units—such as GPUs, which may further employ the use of one or more dedicated hardware accelerators or processing cores to perform ray or path-tracing techniques—of the server(s) 603. The encoder 616 may then encode the display data to generate encoded display data and the encoded display data may be transmitted to the client device 604 over the network(s) 606 via the communication interface 618. The client device 604 may receive the encoded display data via the communication interface 621 and the decoder 622 may decode the encoded display data to generate the display data. The client device 604 may then display the display data via the display 624.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method for adaptive sampling, comprising:
   determining a total number of samples for an image based on a target per-pixel sampling rate for the image;
   distributing the total number of samples across pixels included in the image according to an importance map to produce an initial sampling map for the image; and
   quantizing the initial sampling map using per-pixel random values to produce a sampling map for the image including a quantized sampling rate comprising an integer number of samples for each pixel in the image, wherein the quantized sampling rate is based on a comparison between a fractional portion of an initial sampling rate included in the initial sampling map for the pixel and the per-pixel random value associated with the pixel.

2. The computer-implemented method of claim 1, wherein the integer number is a power-of-two value.

3. The computer-implemented method of claim 1, wherein the distributing and quantizing is performed in parallel for each pixel in the image.

4. The computer-implemented method of claim 1, wherein the image is included in a sequence of images and the per-pixel random values vary for each image in the sequence of images.

5. The computer-implemented method of claim 1, wherein the per-pixel random values are read from a texture map or generated by a function.

6. The computer-implemented method of claim 1, further comprising rendering a scene according to the sampling map to produce a frame.

7. The computer-implemented method of claim 6, wherein the scene is rendered using ray tracing and the sampling map controls a number of rays that are cast for each pixel in the frame.

8. The computer-implemented method of claim 1, wherein the total number of samples is a product of the target per-pixel sampling rate and dimensions of the image.

9. The computer-implemented method of claim 1, further comprising:
summing per-pixel values in the importance map to produce an importance total; and
calculating a factor for the image as the total number of samples divided by the importance total.

10. The computer-implemented method of claim 9, wherein distributing the total number of samples comprises, for each pixel in the image, multiplying the factor by the per-pixel value in the importance map for the pixel to produce the initial sampling rate for the pixel.

11. The computer-implemented method of claim 1, wherein quantizing the initial sampling map comprises, for each pixel in the image:
separating the initial sampling rate for the pixel into an integer portion and the fraction portion; and
incrementing the integer portion to produce the quantized sampling rate for the pixel when the fraction portion is less than the per-pixel random value associated with the pixel, or
setting the quantized sampling rate to equal the integer portion when the fraction portion is not less than the per-pixel random value associated with the pixel.

12. The computer-implemented method of claim 1, wherein the target per-pixel sampling rate is computed based on a rendering frame rate and a target frame rate.

13. The computer-implemented method of claim 1, wherein distributing the total number of samples comprises distributing a minimum number of samples to each pixel before distributing a remainder of the total number of samples across the pixels.

14. The computer-implemented method of claim 1, wherein the steps of determining, distributing, and quantizing are repeated for at least one additional image, additional importance map, and additional per-pixel random values.

15. The computer-implemented method of claim 1, wherein the steps of determining, distributing, and quantizing are performed within a cloud computing environment.

16. The computer-implemented method of claim 1, wherein the steps of determining, distributing, and quantizing are performed on a server or in a data center and the image is streamed to a user device.

17. The computer-implemented method of claim 1, wherein the image is used for training, testing, or certifying a neural network employed in a machine, robot, or autonomous vehicle.

18. The computer-implemented method of claim 1, wherein the steps of determining, distributing, and quantizing are performed on a virtual machine comprising a portion of a graphics processing unit.

19. A system, comprising:
a processor configured to:
determine a total number of samples for an image based on a target per-pixel sampling rate for the image;
distribute the total number of samples across pixels included in the image according to an importance map to produce an initial sampling map for the image; and
quantize the initial sampling map using per-pixel random values to produce a sampling map for the image including a quantized sampling rate comprising an integer number of samples for each pixel in the image, wherein the quantized sampling rate is based on a comparison between a fractional portion of an initial sampling rate included in the initial sampling map for the pixel and the per-pixel random value associated with the pixel.

20. The system of claim 19, wherein the distributing and quantizing is performed in parallel for each pixel in the image.

21. A non-transitory computer-readable media storing computer instructions for adaptive sampling that, when executed by one or more processors, cause the one or more processors to perform the steps of:
determining a total number of samples for an image based on a target per-pixel sampling rate for the image;
distributing the total number of samples across pixels included in the image according to an importance map to produce an initial sampling map for the image; and
quantizing the initial sampling map using per-pixel random values to produce a sampling map for the image including a quantized sampling rate comprising an integer number of samples for each pixel in the image, wherein the quantized sampling rate is based on a comparison between a fractional portion of an initial sampling rate included in the initial sampling map for the pixel and the per-pixel random value associated with the pixel.

* * * * *